United States Patent
Helmstetter et al.

(10) Patent No.: US 11,148,700 B1
(45) Date of Patent: Oct. 19, 2021

(54) STEERING WHEEL ASSEMBLY

(71) Applicants: ZF Passive Safety Systems US Inc., Washington, MI (US); ZF Automotive Germany GmbH, Alfdorf (DE)

(72) Inventors: Matthias Helmstetter, Aschaffenburg (DE); Jeff Harvey, Sterling Heights, MI (US); Christopher Baucher, Washington, MI (US); Marco Tumminello, Niedernberg (DE); Christopher Staab, Haibach (DE)

(73) Assignees: ZF PASSIVE SAFETY SYSTEMS US INC., Washington, MI (US); ZF AUTOMOTIVE SAFETY GERMANY GMBH, Aschaffenburg (DE)

( * ) Notice: Subject to any disclaimer, the term of this patent is extended or adjusted under 35 U.S.C. 154(b) by 0 days.

(21) Appl. No.: 16/851,446

(22) Filed: Apr. 17, 2020

(51) Int. Cl.
| | |
|---|---|
| *B62D 1/06* | (2006.01) |
| *B62D 1/10* | (2006.01) |
| *B60R 21/203* | (2006.01) |
| *F16H 19/04* | (2006.01) |
| *G05D 1/00* | (2006.01) |

(52) U.S. Cl.
CPC .............. *B62D 1/06* (2013.01); *B60R 21/203* (2013.01); *B62D 1/10* (2013.01); *F16H 19/04* (2013.01); *G05D 1/0088* (2013.01)

(58) Field of Classification Search
CPC ....................................................... B62D 1/10
See application file for complete search history.

(56) References Cited

U.S. PATENT DOCUMENTS

| | | | |
|---|---|---|---|
| 7,726,692 B2 | 6/2010 | Ozaki et al. | |
| 2007/0221007 A1* | 9/2007 | Ozaki | B62D 5/006 74/484 R |
| 2017/0297606 A1 | 10/2017 | Kim et al. | |
| 2018/0334183 A1* | 11/2018 | Beauregard | B62D 1/06 |
| 2019/0276065 A1* | 9/2019 | Nagasawa | B62D 1/06 |

OTHER PUBLICATIONS

Applicant: ZF Passive Safety Systems US Inc.; "Steering Wheel Assembly"; PCT International Application No. PCT/US2021/027590; Filed Apr. 16, 2021; International Search Report and Written Opinion; Authorized Officer Harry C. Kim dated May 10, 2021; 6 pgs.

\* cited by examiner

*Primary Examiner* — Vicky A Johnson
(74) *Attorney, Agent, or Firm* — Tarolli, Sundheim, Covell & Tummino LLP

(57) ABSTRACT

A steering wheel assembly for a vehicle includes a support member connectable to a vehicle steering column. A steering wheel has first and second rim portions that are pivotable about at least one pivot axis between a steering position and a folded position. At least one gear drive is rotatable relative to the support member and operably connected to the first and second rim portions. Rotation of the gear drive causes each of the first and second rim portions to pivot about the at least one pivot axis between the steering and folded positions.

22 Claims, 24 Drawing Sheets

STEERING WHEEL ASSEMBLY

FIELD OF THE INVENTION

The present invention relates to a steering wheel assembly for a vehicle. More particularly, the present invention relates to a steering wheel assembly for a vehicle having a steering wheel that is movable between a steering position and a folded position.

BACKGROUND OF THE INVENTION

Certain vehicles are capable of switching between a driver operating mode in which the driver operates the vehicle and an autonomous operating mode in which the vehicle operates with little or no driver input. In vehicles that are switchable between driver and autonomous operating modes, a steering wheel of the vehicle typically remains in the same position regardless of the vehicle's operating mode.

SUMMARY OF THE INVENTION

According to one aspect, a steering wheel assembly for a vehicle includes a support member connectable to a vehicle steering column. A steering wheel has first and second rim portions that are pivotable about at least one pivot axis between a steering position and a folded position. At least one gear drive is rotatable relative to the support member and operably connected to the first and second rim portions. Rotation of the gear drive causes each of the first and second rim portions to pivot about the at least one pivot axis between the steering and folded positions.

BRIEF DESCRIPTION OF THE DRAWINGS

The foregoing and other features of the invention will become apparent to one skilled in the art to which the invention relates upon consideration of the following description of the invention with reference to the accompanying drawings, in which.

DETAILED DESCRIPTION OF THE INVENTION

Figure 1:
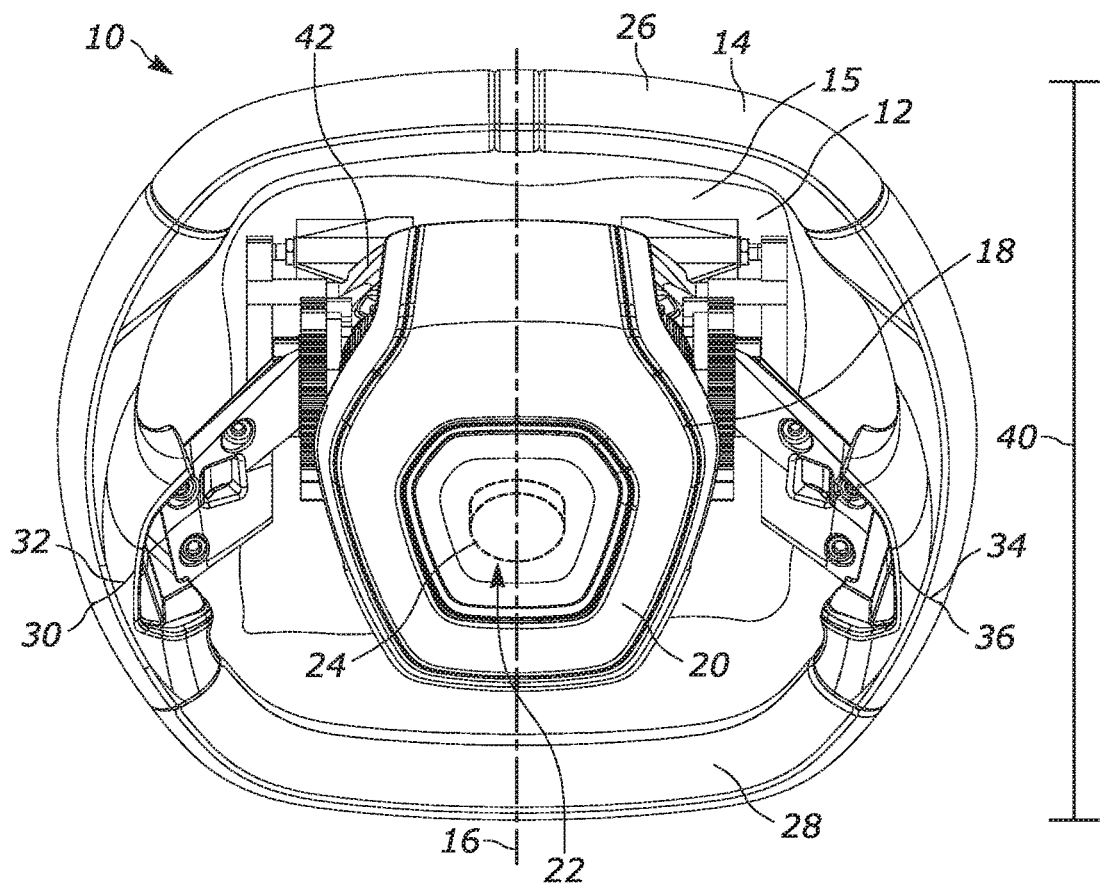
FIG. 1 is a front view of a steering wheel assembly having a steering wheel in a first position.

FIG. 1 illustrates a steering wheel assembly 10 for a vehicle 12. The steering wheel assembly 10 includes a steering wheel 14 that is connected to support member 42. The support member 42 is connected to a steering column that extends through a dashboard or support surface 15 of the vehicle 12. The steering wheel 14 and support member 42 are rotatable about a steering axis 16 relative to the dashboard or support surface 15. The steering wheel assembly 10 also includes an airbag module 18 having a housing 20, an airbag 22 and an inflator 24. The housing 20 is connected to the support member 42. The airbag 22 is inflatable from a stored condition in which the airbag is stored in the housing 20 to a deployed condition in which the airbag is positioned between a vehicle occupant and the steering wheel 14. The inflator 24 is positioned in the housing 20 and configured to provide inflation fluid to the airbag 22 to inflate the airbag from the stored condition to the deployed condition.

During operation of the vehicle 12, a vehicle occupant can turn the steering wheel 14 to operate and steer the vehicle. However, there may be periods in which use of the steering wheel 14 is not required, such as when the vehicle 12 is being driven autonomously (i.e., with little or no occupant input) or when the vehicle is parked. During these periods of non-use, the steering wheel 14 can be moved from a steering position to a folded position.

Figure 2:
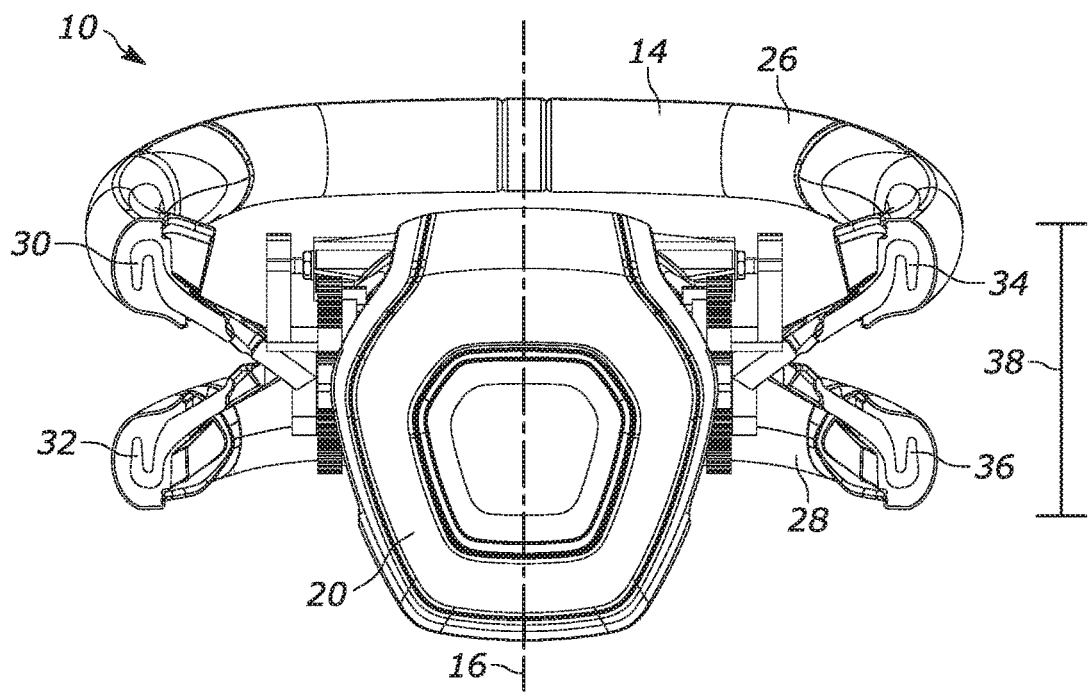
FIG. 2 is a front view of the steering wheel assembly of FIG. 1 having the steering wheel in a second position.

As shown in FIG. 1, in the steering position, the steering wheel 14 can have a generally rounded configuration. The steering wheel 14 has a first rim portion 26 and a second rim portion 28. Although the first and second rim portions 26, 28 are shown in FIGS. 1-2 as being asymmetrical, the first and second portions can be symmetrical. As shown in FIG. 1, the first and second rim portions 26, 28 extend transverse to the steering axis 16 when in the steering position.

As shown in FIG. 2, when the steering wheel 14 is in the folded position, the first and second rim portions 26, 28 extend generally parallel to and/or in the same general direction as the steering axis 16. During the periods of non-use of the steering wheel 14, the first and second rim portions 26, 28 can be moved away from the vehicle occupant so that the vehicle occupant has more space within the vehicle 12 than when the steering wheel is in the steering position. The steering wheel 14, when in the folded position, has a first height 38 measured in a direction transverse to the steering axis 16 (FIG. 2). The steering wheel 14, when in the steering position, has a second height 40 measured in the direction transverse to the steering axis 16 (FIG. 1). The height 38 is less than the height 40. Alternatively, the height 38 can be greater than or equal to the height 40. Once the steering wheel 14 has been moved to the folded position, the steering wheel can be moved toward and/or into the dashboard or support surface 15 through which the steering wheel extends to provide additional space for the vehicle occupant that would otherwise be unavailable.

FIGS. 3-30 depict example steering wheel assemblies 10 configured to move a steering wheel between the steering and folded positions. The example steering wheel assemblies are not necessarily exclusive of each other. Certain features can be shared and/or combined between the example configurations whether expressly stated, shown, or not. Common elements shared between the example steering wheel assemblies may be unnumbered in certain Figures or may have the same reference numbers with the addition of an associated alphabetical mark. Description of common elements and their functions may not be repeated for brevity. Further, portions of the airbag module 18 may not be depicted in the example configurations of FIGS. 3-30 for clarity.

Figure 3:
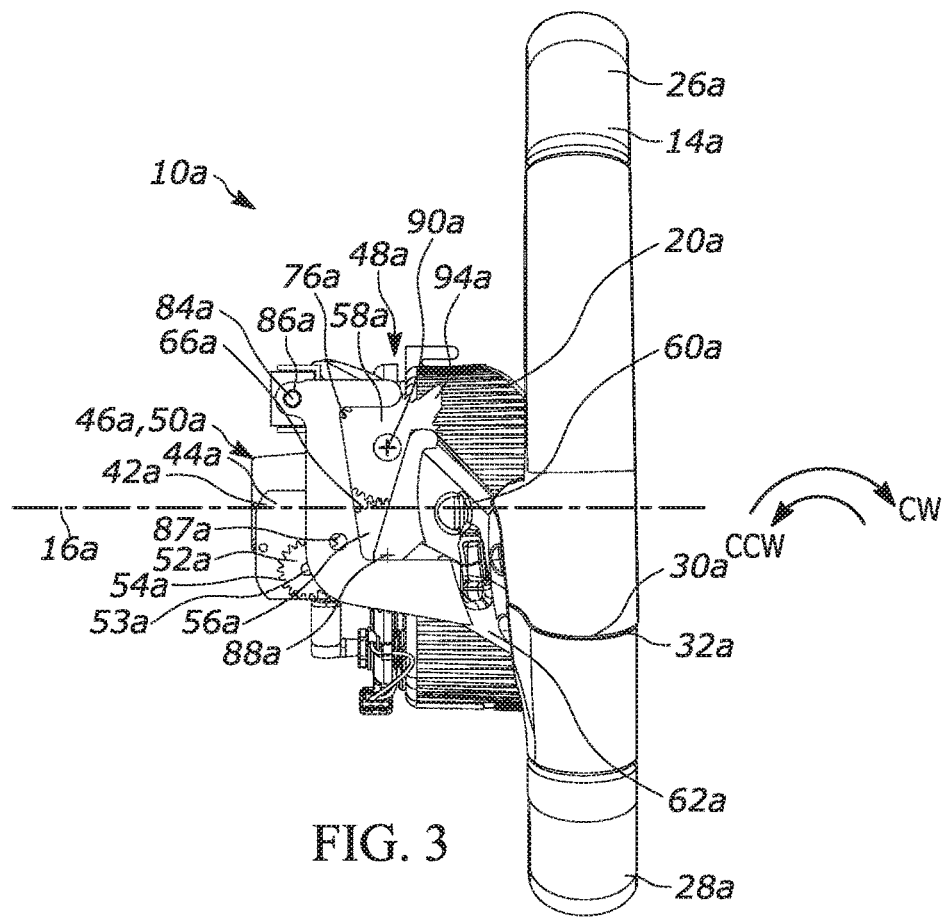
FIG. 3 is a side view of a portion of an example configuration of the steering wheel assembly of FIG. 1, including the steering wheel in the first position.
Figure 4:
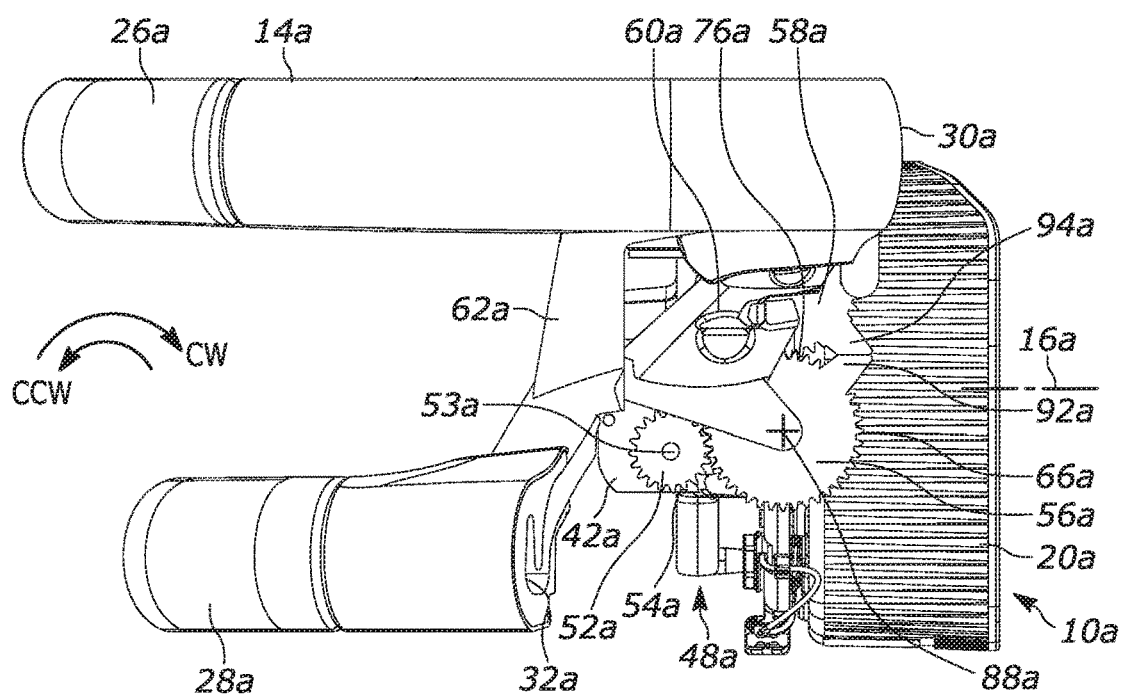
FIG. 4 is a side view of a portion of the example configuration of the steering wheel assembly of FIG. 3, including the steering wheel in the second position.
Figure 5:
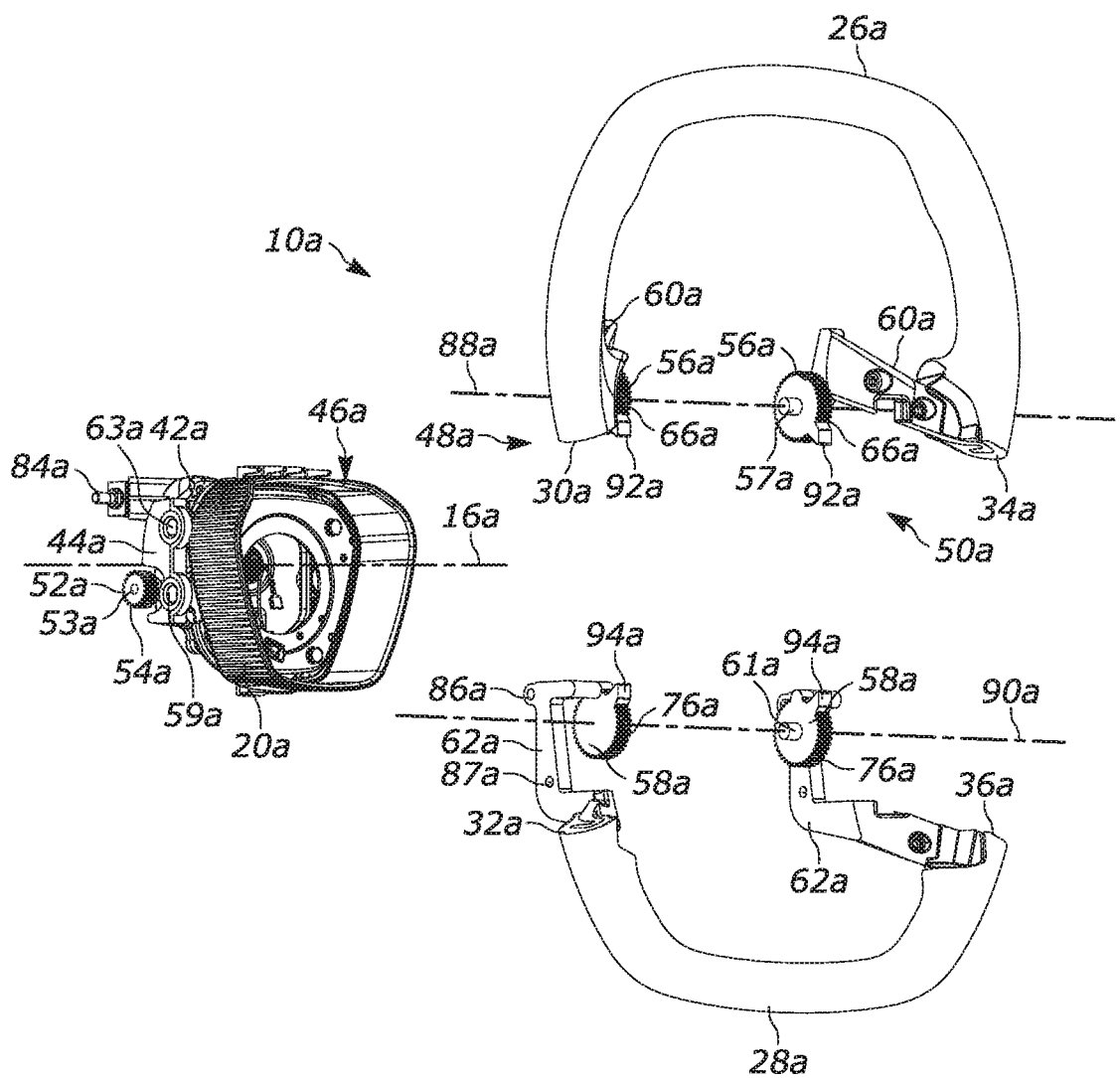
FIG. 5 is an exploded view of the steering wheel assembly of FIG. 3.

FIGS. 3-5 depict an example steering wheel assembly 10a. The steering wheel assembly 10a includes a support member 42a connectable to a steering column that extends through the dashboard or support surface 15. A first rim portion 26a of a steering wheel 14a has first and second ends 30a, 34a. The first end 30a has a first mounting portion 60a for operably connecting the first end to a first side 44a of the support member 42a. The second end 34a has another first mounting portion 60a for operably connecting the second end to a second side 46a of the support member 42a. A second rim portion 28a of the steering wheel 14a has first and second ends 32a, 36a. The first end 32a has a second mounting portion 62a for operably connecting the first end to the first side 44a of the support member 42a. The second end 34a has another second mounting portion 62a for operably connecting the second end to the second side 46a of the support member 42a.

The steering wheel 14a can be moved between the steering and folded positions by first and second switching portions 48a, 50a of the steering wheel assembly 10a. As shown in FIGS. 3-4, the first switching portion 48a is on the first side 44a of the support member 42a. The second switching portion 50a is on the second side 46a of the support member 42a. The second switching portion 50a can mirror at least a portion of the first switching portion 48a. Common features that are present in both the first and second switching portions 48a, 50a operate in a similar manner. Thus, for the sake of brevity, only the first switching portion 48a will be described below.

As shown in FIGS. 3-5, the first switching portion 48a includes a gear drive 52a. The gear drive 52a may be rotated by a motor 53a. The gear drive is supported on the first side 44a of the support member 42a. The gear drive 52a is operably connected to the first and second rim portions 26a, 28a. The gear drive 52a includes gear teeth 54a. The gear drive 52a can be electrically, hydraulically, and/or pneumatically powered. A controller actuates the gear drive when the vehicle occupant desires and/or when certain vehicle conditions are met, such as when the vehicle 12 is parked.

A cylindrical first projection 57a of a first transfer member 56a extends into a first opening 59a in the first side 44a of the support member 42a. The first transfer member 56a is rotatable relative to the support member 42a. The first transfer member 56a is fixedly connected to the first mounting portion 60a. Therefore, the first rim portion 26a is pivotably connected to the support member 42a. The first transfer member 56a has teeth 66a that engage the gear teeth 54a of the gear drive 52a. The first transfer member 56a, the first mounting portion 60a and the first rim portion 26a can be formed together as a single piece or as separate pieces that are connected to one another.

A cylindrical second projection 61a of a second transfer member 58a extends into a second opening 63a in the first side 44a of the support member 42a. The second transfer member 58a is rotatable relative to the support member 42a. The second transfer member 58a is fixedly connected to the second mounting portion 62a. Therefore, the second rim portion 28a is pivotably connected to the support member 42a. The second transfer member 58a has teeth 76a that engage the teeth 66a of the first transfer member 56a. The second transfer member 58a transfers rotary motion of the first transfer member 56a to the second rim portion 28a. The second transfer member 58a, the second mounting portion 62a and the second rim portion 28a can be formed together as a single piece or as separate pieces that are connected to one another.

As shown in FIGS. 3-5, the support member 42a has an actuatable locking member 84a connected thereto. The locking member 84a can be an axial movable pin electrically connected to the same controller that the gear drive 52a is connected to or to a separate controller. When the steering wheel 14a is in the steering position, the locking member 84a can be actuated to engage a steering position locking member 86a on the second mounting portion 62a to prevent the steering wheel from moving to the folded position. The locking member 86a may be a first opening in the second mounting portion 62a into which the pin 84a extends. When the steering wheel 14a is in the folded position, the locking member 84a can be actuated to engage a folded position locking member 87a on the second mounting portion 62a to prevent the steering wheel from moving to the steering position. The locking member 87a may be a second opening in the second mounting portion 62a into which the pin 84a extends. Although the locking members 86a, 87a are shown on the second mounting portion 62a, the locking members 86a, 87a can be on the first mounting portion 60a, the first transfer member 56a and/or the second transfer member 58a.

As shown in FIGS. 3-4, with the steering wheel 14a in the steering position, actuation of the gear drive 52a causes the first and second rim portions 26a, 28a to pivot relative to the support member 42a from the steering position to the folded position. The gear drive 52a rotates in a clockwise direction CW relative to the support member 42a upon actuation. The rotating gear drive 52a rotates the first transfer member 56a in a counterclockwise direction CCW relative to the support member 42a. The first mounting portion 60a pivots in the counterclockwise direction CCW relative to the support member 42a. As the first mounting portion 60a pivots relative to the support member 42a, the first rim portion 26a pivots about a first pivot axis 88a in the counterclockwise direction CCW relative to the support member from the steering position to the folded position.

The rotating first transfer member 56a also rotates the second transfer member 58a in the clockwise direction CW relative to the support member 42a. The second mounting portion 62a pivots in the clockwise direction CW relative to the support member 42a. As the second mounting portion 62a pivots relative to the support member 42a, the second rim portion 28a pivots about the second pivot axis 90a in the clockwise direction CW relative to the support member from the steering position to the folded position. The first and second pivot axes 88a, 90a extend generally parallel to each other and transverse to the steering axis 16a. As shown in FIGS. 3-5, the first and second transfer members 56a, 58a can have first and second stop projections 92a, 94a. The projections 92a, 94a engage one another when the first and second rim portions 26a, 28a reach the folded position.

The gear drive 52a can be actuated to reverse the above described process and cause the first and second rim portions 26a, 28a to pivot about the first and second pivot axes 88a, 90a, respectively, relative to the support member 42a from the folded position to the steering position.

Figure 6:
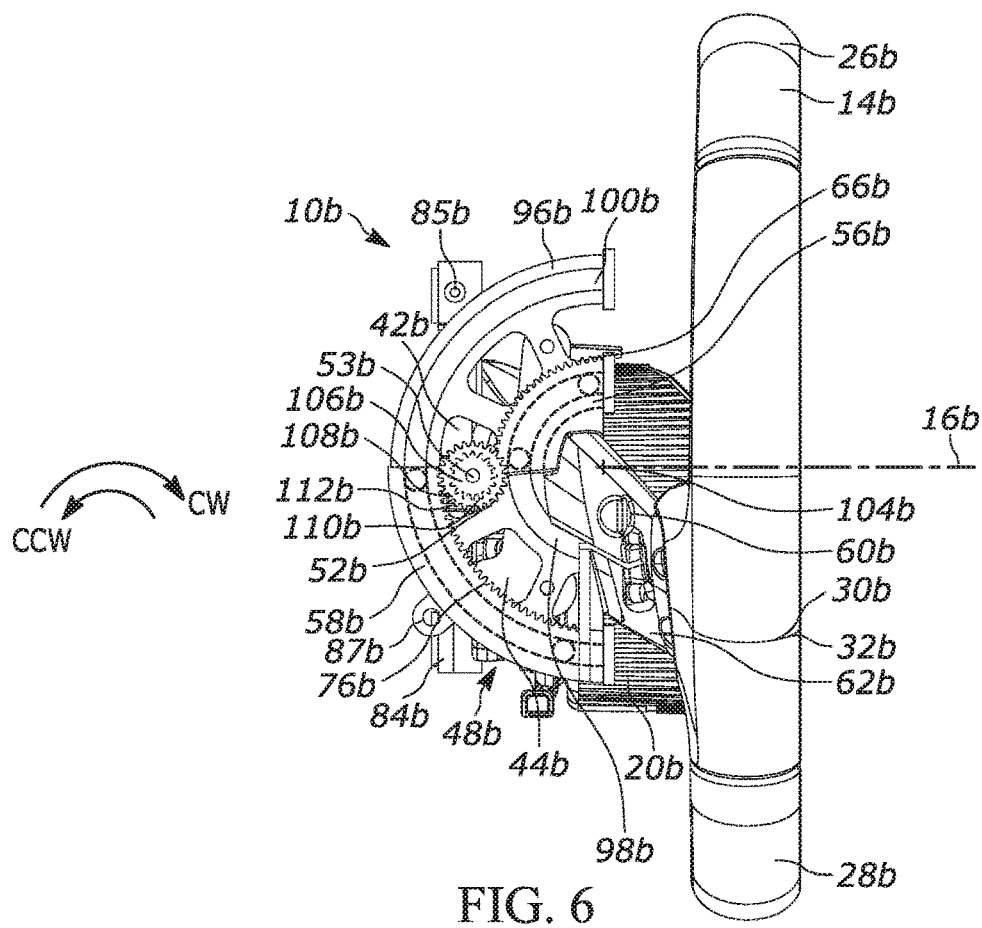
FIG. 6 is a side view of a portion of an example configuration of the steering wheel assembly of FIG. 1, including the steering wheel in the first position.
Figure 7:
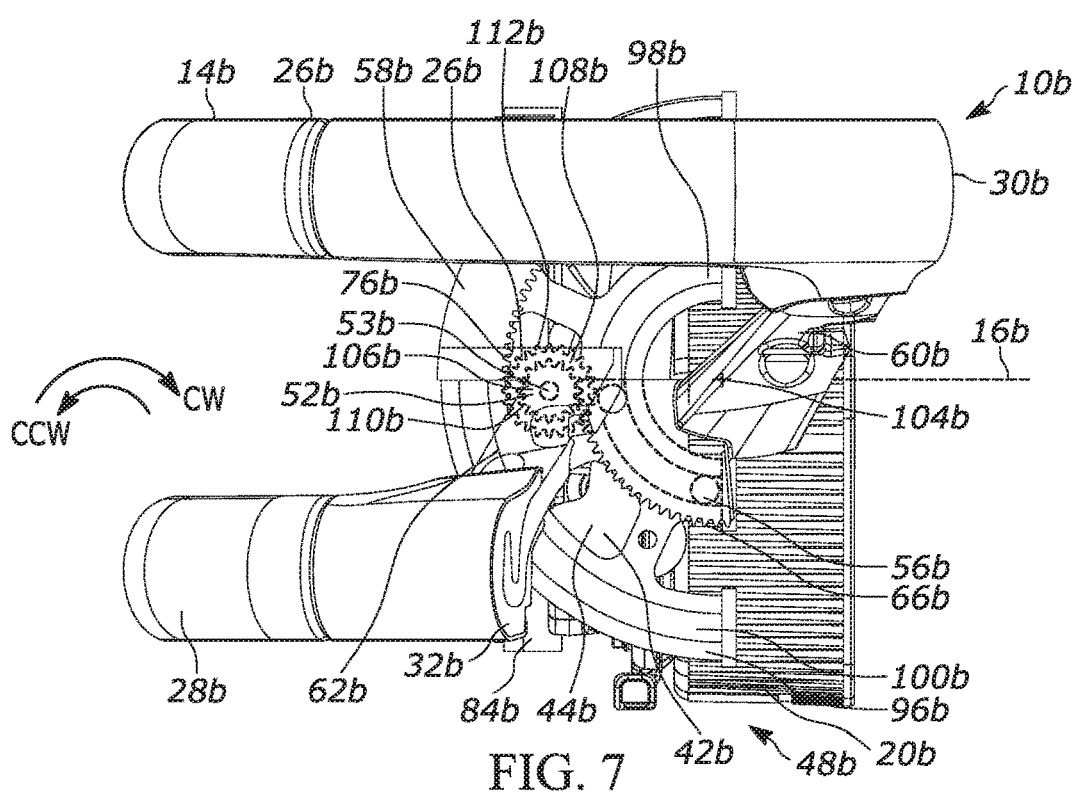
FIG. 7 is a side view of a portion of the example configuration of the steering wheel assembly of FIG. 6, including the steering wheel in the second position.
Figure 8:
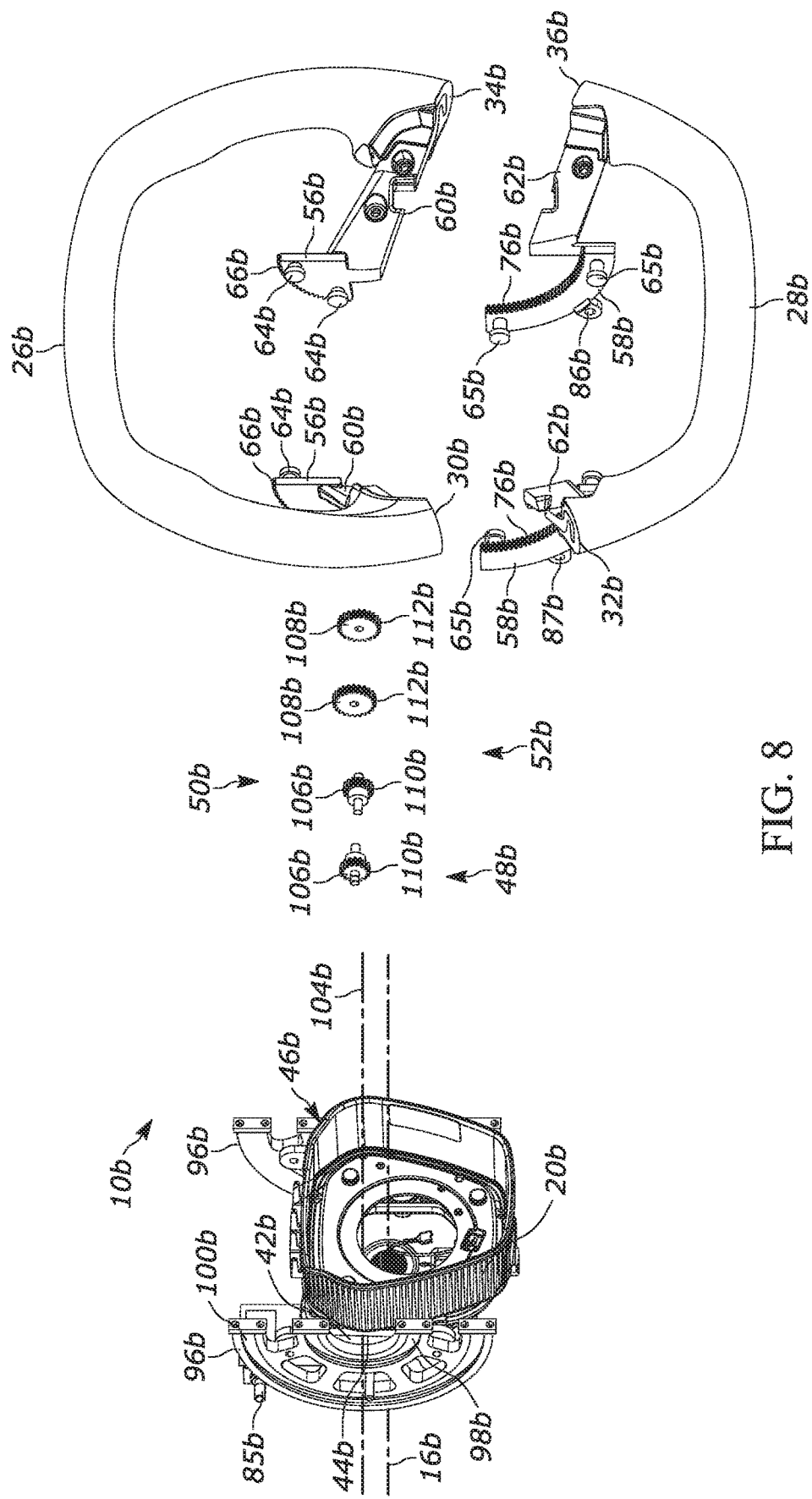
FIG. 8 is an exploded view of the steering wheel assembly of FIG. 6.

FIGS. 6-8 depict another example steering wheel assembly 10b. The steering wheel assembly 10b includes a support member 42b connectable to a steering column that extends through the dashboard or support surface 15. A first rim portion 26b of a steering wheel 14b has first and second ends 30b, 34b. The first end 30b has a first mounting portion 60b for operably connecting the first end to a first side 44b of the support member 42b. The second end 34b has another first mounting portion 60b for operably connecting the second end to a second side 46b of the support member 42b. A second rim portion 28b of the steering wheel 14b has first and second ends 32b, 36b. The first end 32b has a second mounting portion 62b for operably connecting the first end to the first side 44b of the support member 42b. The second end 34b has another second mounting portion 62b for operably connecting the second end to the second side 46b of the support member 42b.

The steering wheel 14b can be moved between the steering and folded positions by first and second switching portions 48b, 50b of the steering wheel assembly 10b. As shown in FIGS. 6-7, the first switching portion 48b is on the first side 44b of the support member 42b. The second switching portion 50b is on the second side 46b of the support member 42b. The second switching portion 50b can mirror at least a portion of the first switching portion 48b. Common features that are present in both the first and second switching portions 48b, 50b operate in a similar manner. Thus, for the sake of brevity, only the first switching portion 48b will be described below.

As shown in FIGS. 6-8, the first switching portion 48b includes a guide member 96b connected to the first side 44b of the support member 42b. The guide member 96b has first and second curved tracks 98b, 100b. Each of the first and second curved tracks 98b, 100b are curved about the same axis 104b. The axis 104b extends generally transverse to the steering axis 16b.

A gear drive 52b is positioned between the first and second curved tracks 98b, 100b of the guide member 96b. The gear drive 52b may be rotated by a motor 53b. The gear drive 52b has a first gear 106b and a second gear 108b. The first gear 106b is rotatably supported on the first side 44b of the support member 42b. The second gear 108b is connected to the first gear 106b so that the first gear is between the first side 44b of the support member 42b and the second gear 108b. The first and second gears 106b, 108b of the gear drive 52b include gear teeth 110b, 112b.

A first transfer member 56b includes teeth 66b that engage the gear teeth 110b of the first gear 106b. The first transfer member 56b has pins 64b that are held within and slide along the first curved track 98b. The first transfer member 56b pivots/rotates about the axis 104b while sliding along the first curved track 98b. The first transfer member 56b is fixedly connected to the first mounting portion 60b. Therefore, the first rim portion 26b is pivotably connected to the guide member 96b.

A second transfer member 58b includes teeth 76b that engage the gear teeth 112b of the second gear 108b. The second transfer member 58b has pins 65b that are held within and slide along the second curved track 100b. The second transfer member 58b pivots/rotates about the axis 104b while sliding along the second curved track 100b. The second transfer member 58b is fixedly connected to the second mounting portion 62b. Therefore, the second rim portion 28b is pivotably connected to the guide member 96b.

As shown in FIGS. 6-8, the support member 42b has a steering position locking member 84b on the second side 46b of the support member and a folded position locking member 85b on the first side 44b of the support member. Although the locking member 84b is not clearly shown in FIGS. 6-8, the locking member 84b mirrors the locking member 85b. The steering and folded position locking members 84b, 85b can be axially movable pins electrically connected to the same controller that the gear drive 52b is connected to or to a separate controller. When the steering wheel 14b is in the steering position, the steering position locking member 84b can be actuated to engage a steering position locking member 86b on the second transfer member 58b of the second switching portion 50b to prevent the steering wheel from moving to the folded position. The locking member 86b may be an opening in the second transfer member 58*b* of the second switching portion 50*b* into which the pin 84*b* extends. When the steering wheel 14*b* is in the folded position, the folded position locking member 85*b* can be actuated to engage a folded position locking member 87*b* on the second transfer member 58*b* of the first switching portion 48*b* to prevent the steering wheel from moving to the steering position. The locking member 87*b* may be an opening in the second transfer member 58*b* of the first switching portion 48*b* into which the pin 85*b* extends. Although the locking members 86*b*, 87*b* are shown on the second transfer members 58*b*, the locking members 86*b*, 87*b* can be on the first mounting portions 60*b*, the second mounting portions 62*b* and/or the first transfer members 56*b*.

As shown in FIGS. 6-7, with the steering wheel 14*b* in the steering position, actuation of the gear drive 52*b* causes the first and second rim portions 26*b*, 28*b* to pivot relative to the support member 42*b* from the steering position to the folded position. The first and second gears 106*b*, 108*b* of the gear drive 52*b* rotate in the clockwise direction CW relative to the support member 42*b* upon actuation. The rotating first gear 106*b* causes the first transfer member 56*b* to slide along the first curved track 98*b*. The first transfer member 56*b* rotates in the counterclockwise direction CCW about the axis 104*b* relative to the guide member 96*b* as the first transfer member slides along the first curved track 98*b*. The first mounting portion 60*b* pivots in the counterclockwise direction CCW relative to the guide member 96*b*. As the first mounting portion 60*b* pivots relative to the guide member 96*b*, the first rim portion 26*b* pivots about the axis 104*b* in the counterclockwise direction CCW relative to the guide member from the steering position to the folded position.

The rotating second gear 108*b* causes the second transfer member 58*b* to slide along the second curved track 100*b*. The second transfer member 58*b* rotates in the clockwise direction CW about the axis 104*b* relative to the guide member 96*b* as the second transfer member slides along the second curved track 100*b*. The second mounting portion 62*b* pivots in the clockwise direction CW relative to the guide member 96*b*. As the second mounting portion 62*b* pivots relative to the guide member 96*b*, the second rim portion 28*b* pivots about the axis 104*b* in the clockwise direction CW relative to the guide member from the steering position to the folded position.

The gear drive 52*b* can be actuated to reverse the above described process and cause the first and second rim portions 26*b*, 28*b* to pivot about the axis 104*b* relative to the guide member 96*b* from the folded position to the steering position.

Figure 9:
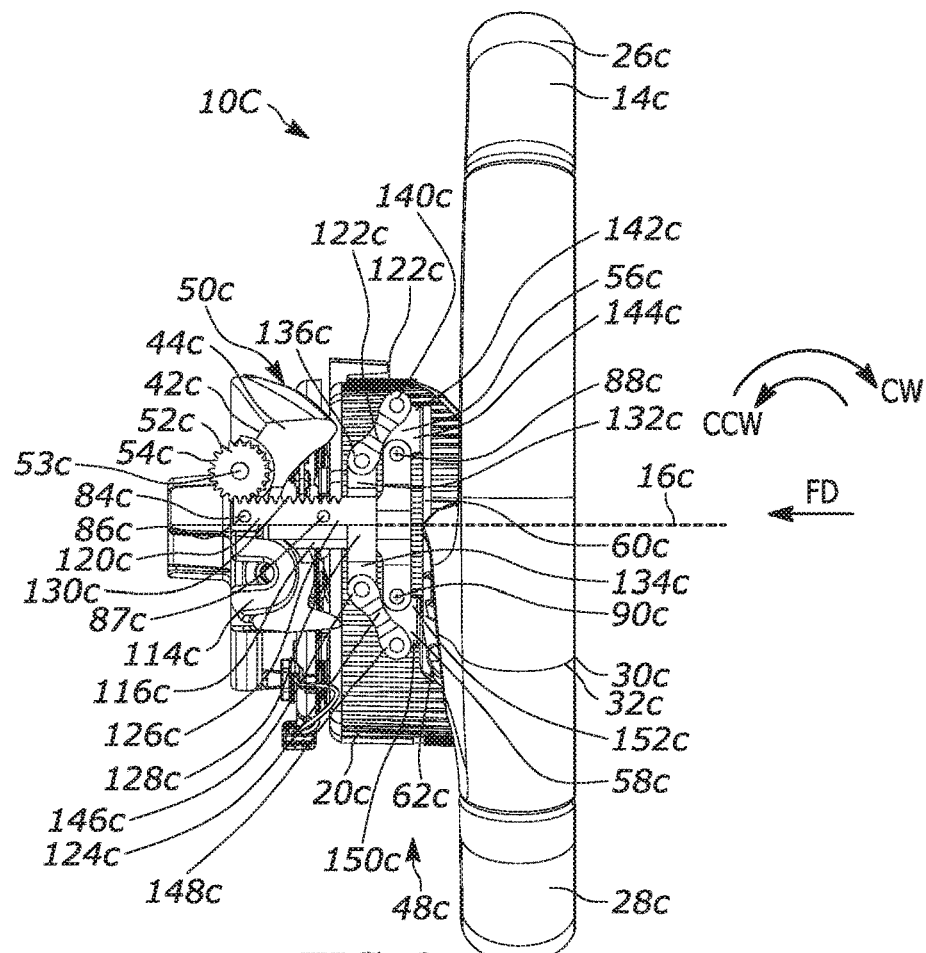
FIG. 9 is a side view of a portion of an example configuration of the steering wheel assembly of FIG. 1, including the steering wheel in the first position.
Figure 10:
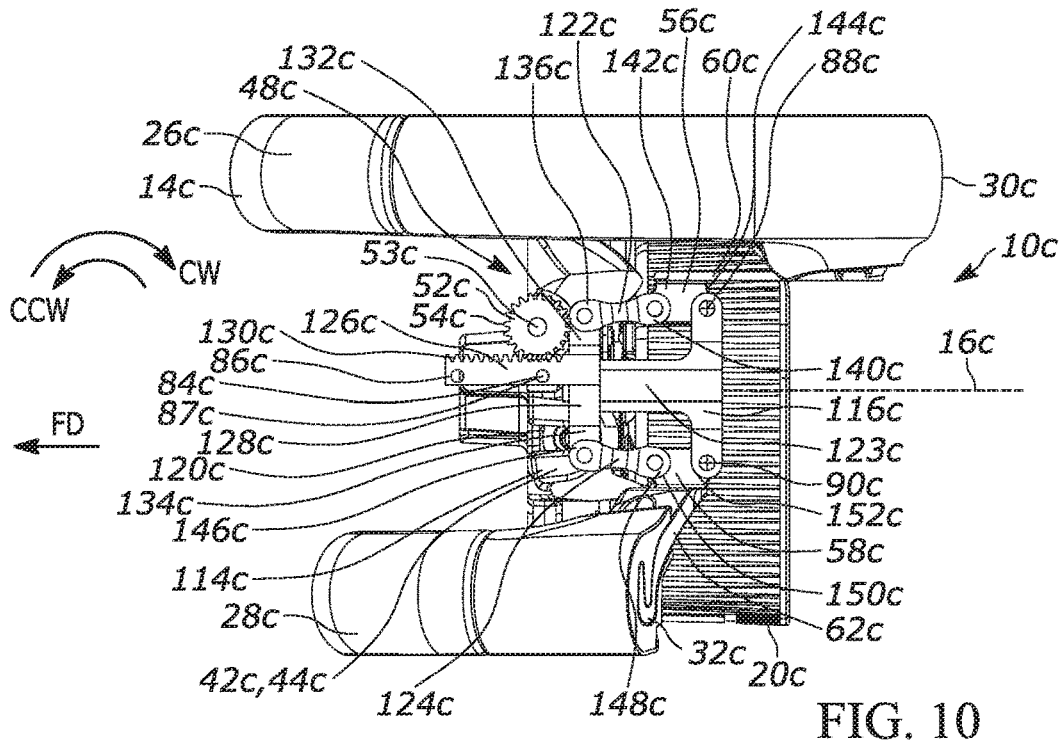
FIG. 10 is a side view of a portion of the example configuration of the steering wheel assembly of FIG. 9, including the steering wheel in the second position.
Figure 11:
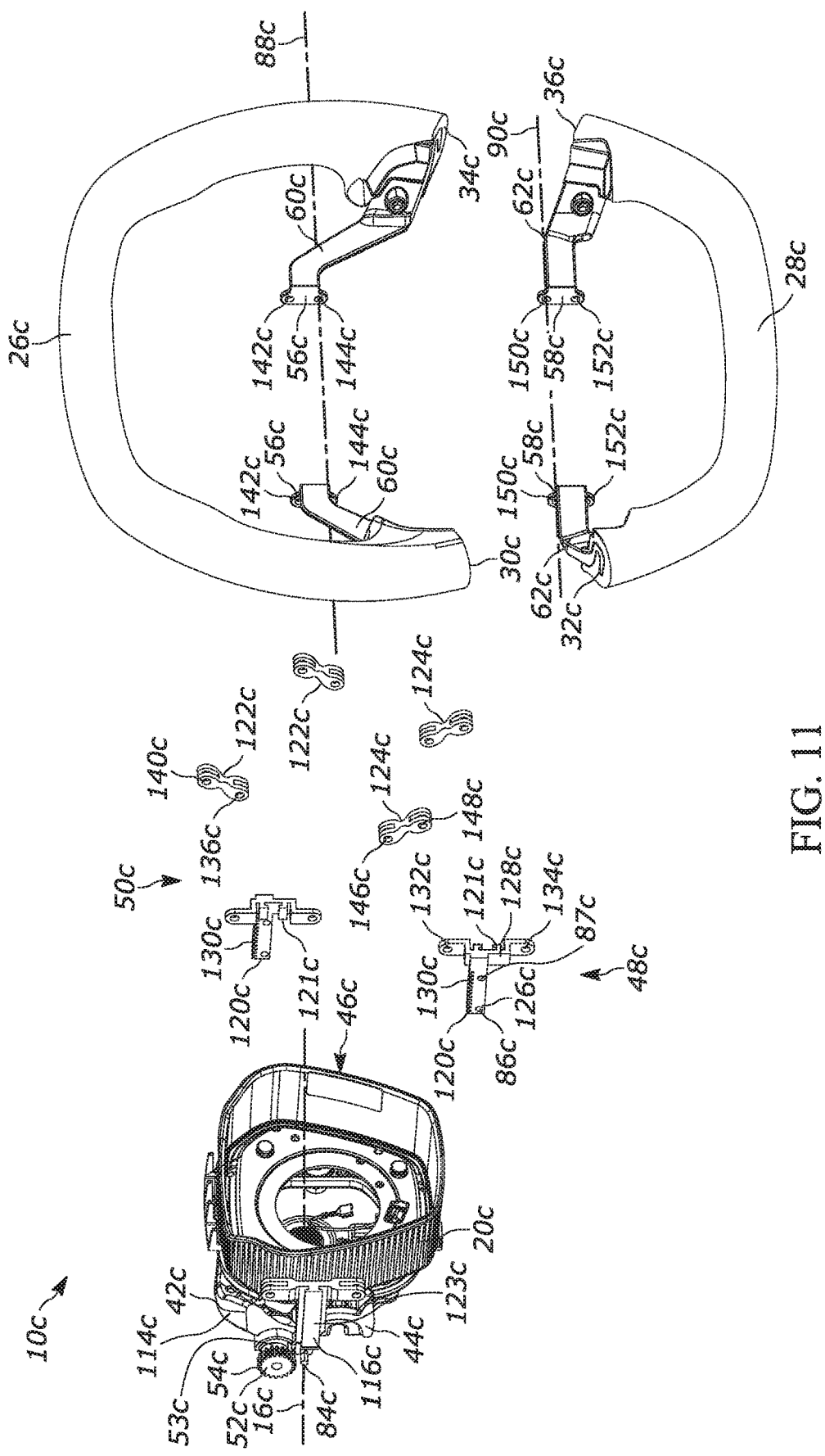
FIG. 11 is an exploded view of the steering wheel assembly of FIG. 9.

FIGS. 9-11 depict an example steering wheel assembly 10*c*. The steering wheel assembly 10*c* includes a support member 42*c* having a base portion 114*c* connectable to a steering column that extends through the dashboard or support surface 15. A first support arm 116*c* extends from the base portion 114*c* on a first side 44*c* of the support member 42*c*. A second support arm (not shown) extends from the base portion 114*c* on a second side 46*c* of the support member 42*c*. The first and second support arms 116*c* extend generally parallel to each other and the steering axis 16*c*. The second support arm can mirror the first support arm 116*c*.

A first rim portion 26*c* of a steering wheel 14*c* has first and second ends 30*c*, 34*c*. The first end 30*c* has a first mounting portion 60*c* for operably connecting the first end to the first support arm 116*c*. The second end 34*c* has another first mounting portion 60*c* for operably connecting the second end to the second support arm. A second rim portion 28*c* of the steering wheel 14*c* has first and second ends 32*c*, 36*c*. The first end 32*c* has a second mounting portion 62*c* for operably connecting the first end to the first support arm 116*c*. The second end 34*c* has another second mounting portion 62*c* for operably connecting the second end to the second support arm.

The steering wheel 14*c* can be moved between the steering and folded positions by first and second switching portions 48*c*, 50*c* of the steering wheel assembly 10*c*. As shown in FIGS. 9-11, the first switching portion 48*c* is on the first side 44*c* of the support member 42*c*. The second switching portion 50*c* is on the second side 46*c* of the support member 42*c*. The second switching portion 50*c* can mirror at least a portion of the first switching portion 48*c*. Common features that are present in both the first and second switching portions 48*c*, 50*c* operate in a similar manner. Thus, for the sake of brevity, only the first switching portion 48*c* will be described below.

As shown in FIGS. 9-11, the first switching portion 48*c* includes a gear drive 52*c*. The gear drive 52*c* may be rotated by a motor 53*c*. The gear 52*c* is rotatably supported on first side 44*c* of the support member 42*c*. The gear drive 52*c* includes gear teeth 54*c*.

A carriage 120*c* has a first carriage portion 126*c* that extends generally parallel to the steering axis 16*c* and a second carriage portion 128*c* that extends transverse to the first carriage portion. The first carriage portion 126*c* has teeth 130*c* that engage the gear teeth 54*c* in a manner similar to that of a rack and pinion. The first carriage portion 126*c* has a guide track 121*c* that slides on a guide projection 123*c* on the first support arm. The second carriage portion 128*c* has a first end 132*c* and an opposite, second end 134*c*.

A first end 136*c* of a first link 122*c* is pivotably connected to the first end 132*c* of the second carriage portion 128*c*. A second end 140*c* of the first link 122*c* is pivotably connected to a first end 142*c* of a first transfer member 56*c*. A second end 144*c* of the first transfer member 56*c* is pivotably connected to the first support arm 116*c*. The first transfer member 56*c* is fixedly connected to the mounting portion 60*c*. Therefore, the first rim portion 26*c* is pivotably connected to the first support arm 116*c*.

A first end 146*c* of a second link 124*c* is pivotably connected to the second end 134*c* of the second carriage portion 128*c*. A second end 148*c* of the second link 124*c* is pivotably connected to a first end 150*c* of a second transfer member 58*c*. A second end 152*c* of the second transfer member 58*c* is pivotably connected to the first support arm 116*c*. The second transfer member 58*c* is fixedly connected to the mounting portion 62*c*. Therefore, the second rim portion 28*c* is pivotably connected to the first support arm 116*c*.

As shown in FIGS. 9-11, the support member 42*c* has a locking member 84*c*. The locking member 84*c* can be an axially movable pin electrically connected to the same controller that the gear drive 52*c* is connected to or to a separate controller. When the steering wheel 14*c* is in the steering position, the locking member 84*c* can be actuated to engage a steering position locking member 86*c* on the first carriage portion 126*c* to prevent the steering wheel from moving to the folded position. The locking member 86*c* may be a first opening in the first carriage portion 126*c* into which the pin 84*c* extends. When the steering wheel 14*c* is in the folded position, the locking member 84*c* can be actuated to engage a folded position locking member 87*c* on the first carriage portion 126*c* to prevent the steering wheel from moving to the steering position. The locking member 87*c* may be a second opening in the first carriage portion 126c into which the pin 84c extends.

As shown in FIGS. 9-10, with the steering wheel 14c in the steering position, actuation of the gear drive 52c causes the first and second rim portions 26c, 28c to pivot relative to the support member 42c from the steering position to the folded position. The gear drive 52c rotates in a clockwise direction CW relative to the support member 42c upon actuation. The carriage 120c linearly moves in a first direction FD relative to the support member 42c. The first link 122c is pulled in the first direction FD by the second carriage portion 128c. The first transfer member 56c pivots/rotates in the counterclockwise direction CCW relative to the first support arm 116c. The first mounting portion 60c pivots in the counterclockwise direction CCW relative to the first support arm 116c. As the first mounting portion 60c pivots relative to the first support arm 116c, the first rim portion 26c pivots about a first pivot axis 88c in the counterclockwise direction CCW relative to the support member 42c from the steering position to the folded position.

The second link 124c is also pulled in the first direction FD by the second carriage portion 128c. The second transfer member 58c pivots/rotates in the clockwise direction CW relative to the first support arm 116c. The second mounting portion 62c pivots in the clockwise direction CW relative to the first support arm 116c. As the second mounting portion 62c pivots relative to the first support arm 116c, the second rim portion 28c pivots about a second pivot axis 90c in the clockwise direction CW relative to the support member 42c from the steering position to the folded position. The first and second pivot axes 88c, 90c extend generally parallel to each other and transverse to the steering axis 16c.

The gear drive 52c can be actuated to reverse the above described process and cause the first and second rim portions 26c, 28c to pivot about the first and second pivot axes 88c, 90c, respectively, relative to the support member 42c from the folded position to the steering position.

FIGS. 12-19 depict an example steering wheel assembly 10d. The steering wheel assembly 10d includes a support member 42d having a base portion 114d connectable to a steering column that extends through the dashboard or support surface 15. First and second support arms 116d, 118d extend from the base portion 114d on first and second sides 44d, 46d, respectively, of the support member 42d. The first and second support arms 116d, 118d extend generally parallel to each other and the steering axis 16d.

A first rim portion 26d of a steering wheel 14d has first and second ends 30d, 34d. The first end 30d has a first mounting portion 60d for operably connecting the first end to the first support arm 116d. The second end 34d has another first mounting portion 60d for operably connecting the second end to the second support arm 118d. A second rim portion 28d of the steering wheel 14d has first and second ends 32d, 36d. The first end 32d has a second mounting portion 62d for operably connecting the first end to the first support arm 116d. The second end 34d has another second mounting portion 62d for operably connecting the second end to the second support arm 118d.

Figure 12:
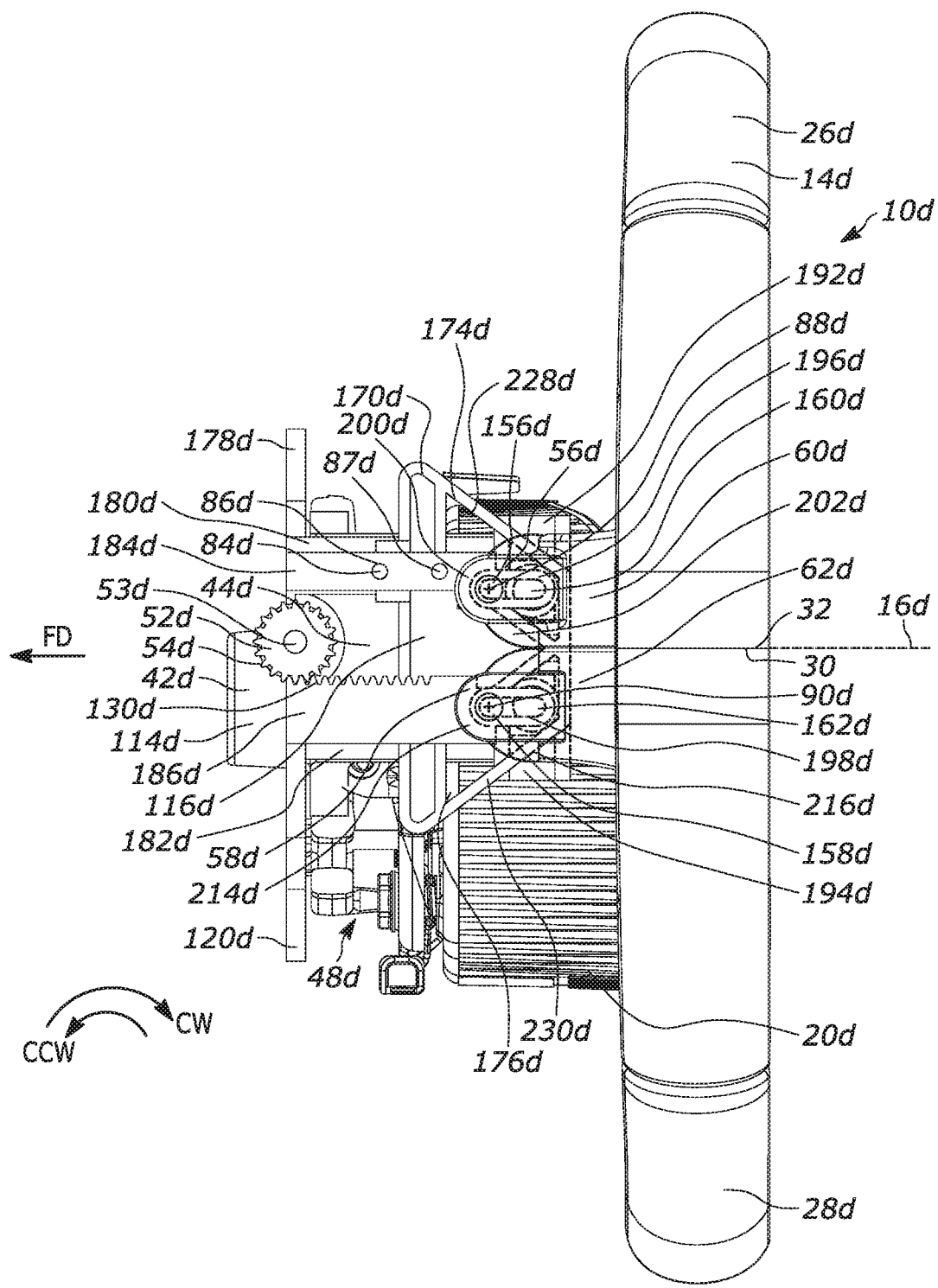
FIG. 12 is a side view of a portion of an example configuration of the steering wheel assembly of FIG. 1, including the steering wheel in the first position.
Figure 13:
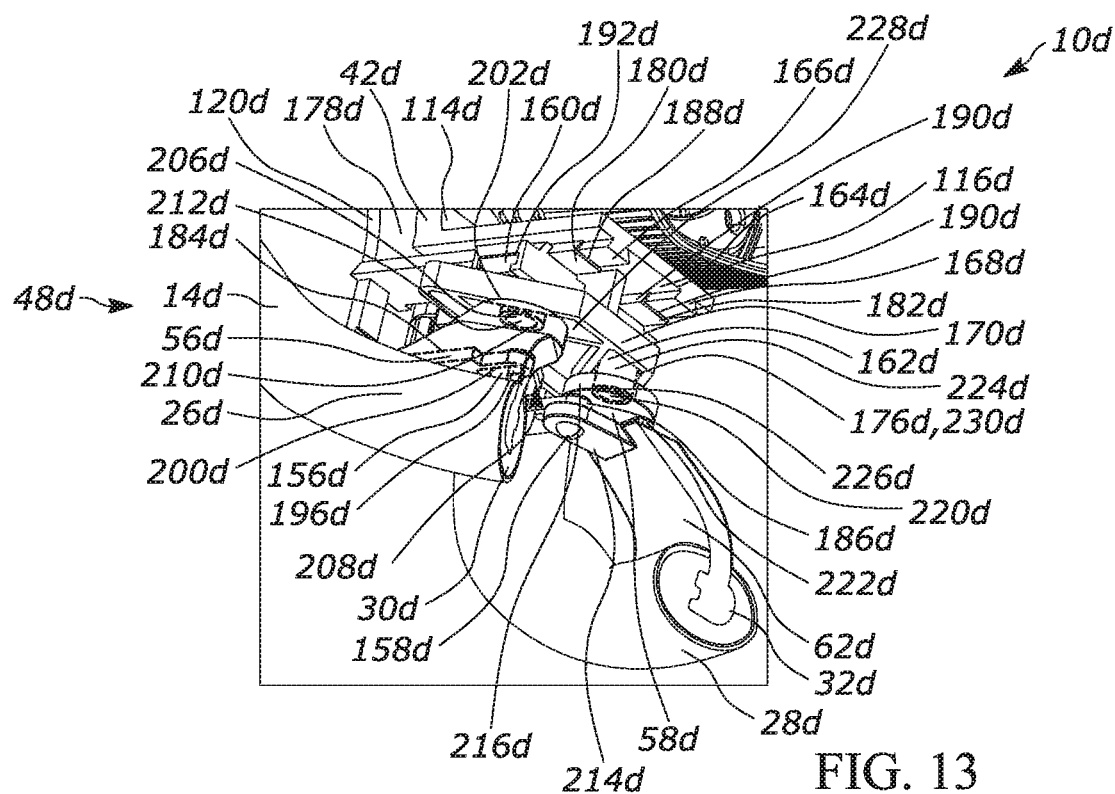
FIG. 13 is a perspective side view of a portion of the example configuration of the steering wheel assembly of FIG. 12, including the steering wheel in a position that is between the first and second positions.
Figure 14:
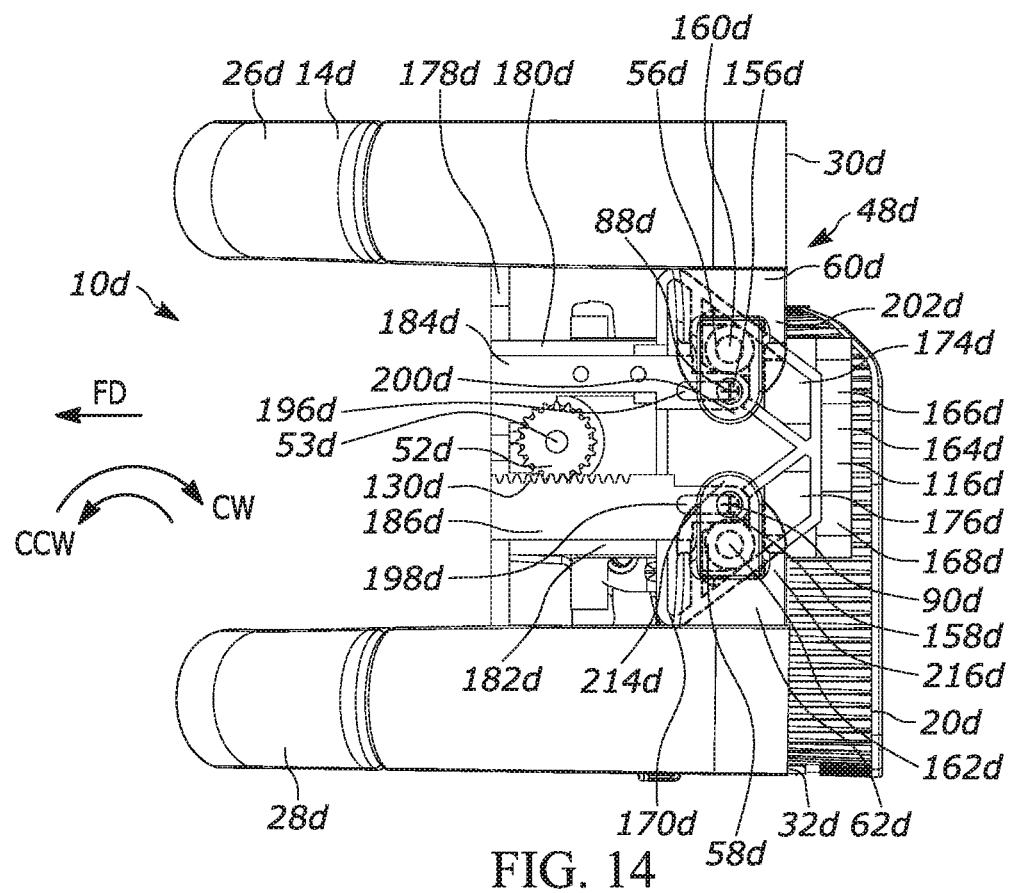
FIG. 14 is a side view of a portion of the example configuration of the steering wheel assembly of FIG. 12, including the steering wheel in the second position.
Figure 15:
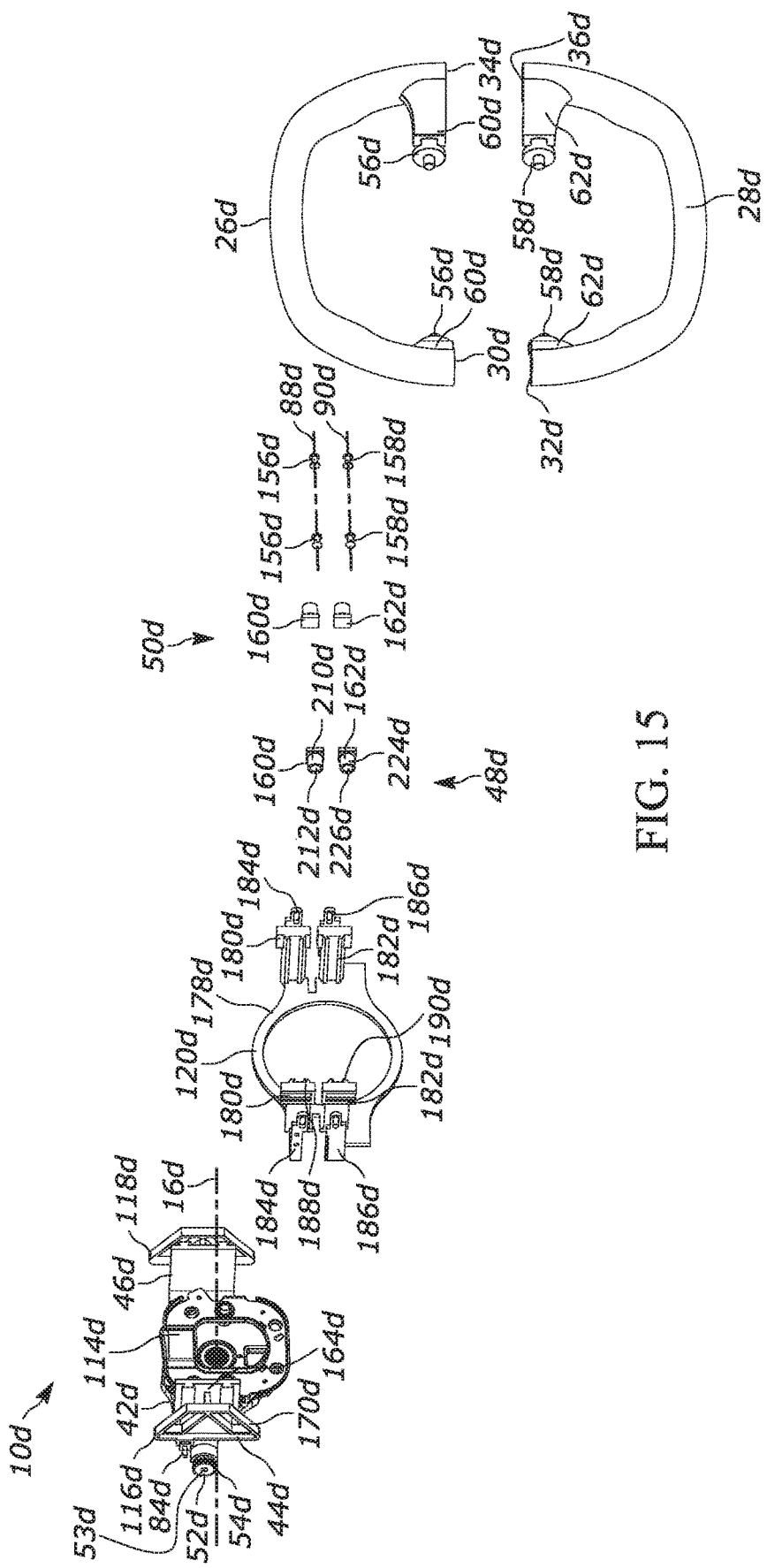
FIG. 15 is an exploded view of the steering wheel assembly of FIG. 12.
Figure 16:
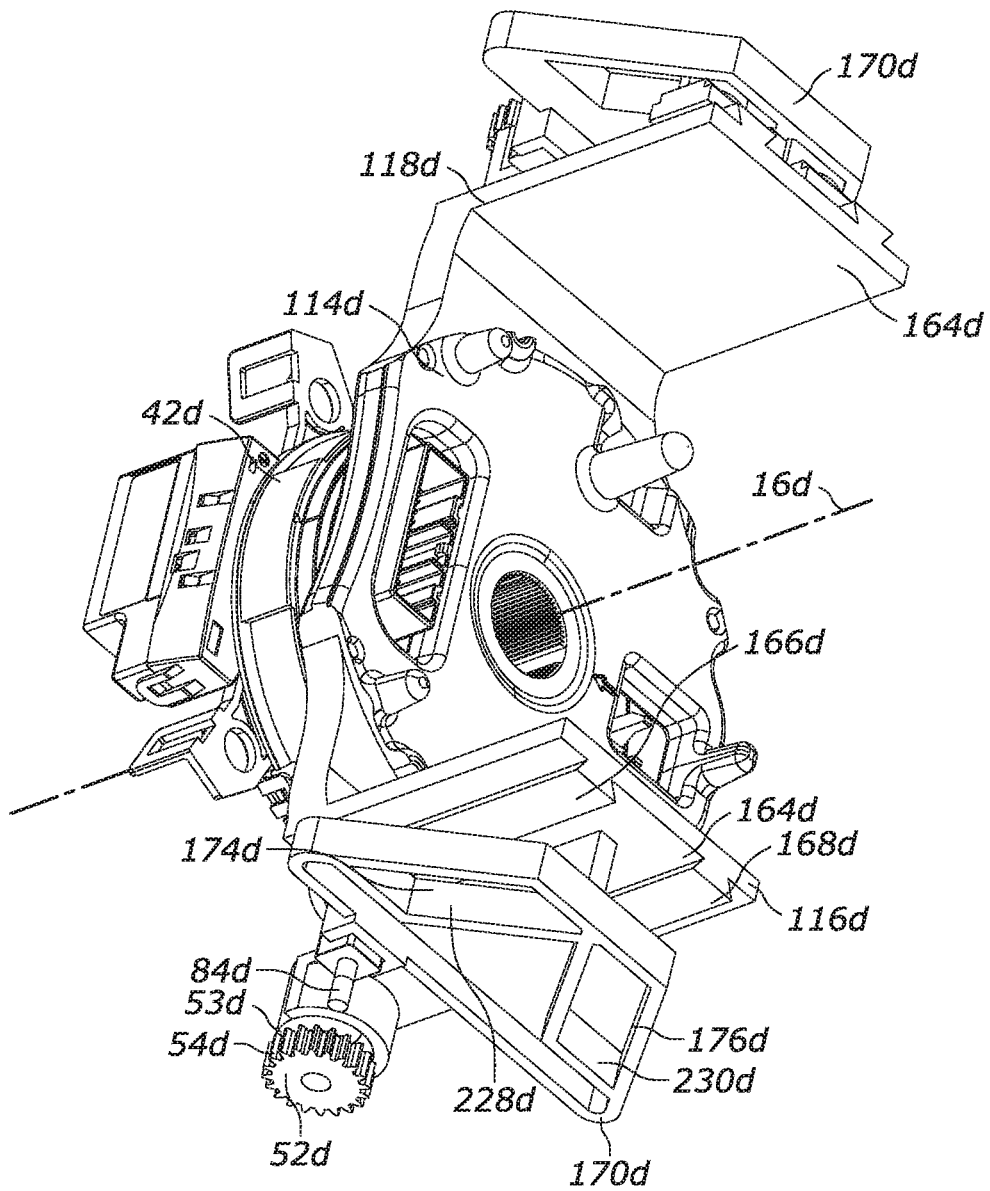
FIG. 16 is a perspective top view of an element of the steering wheel assembly of FIG. 12.
Figure 17:
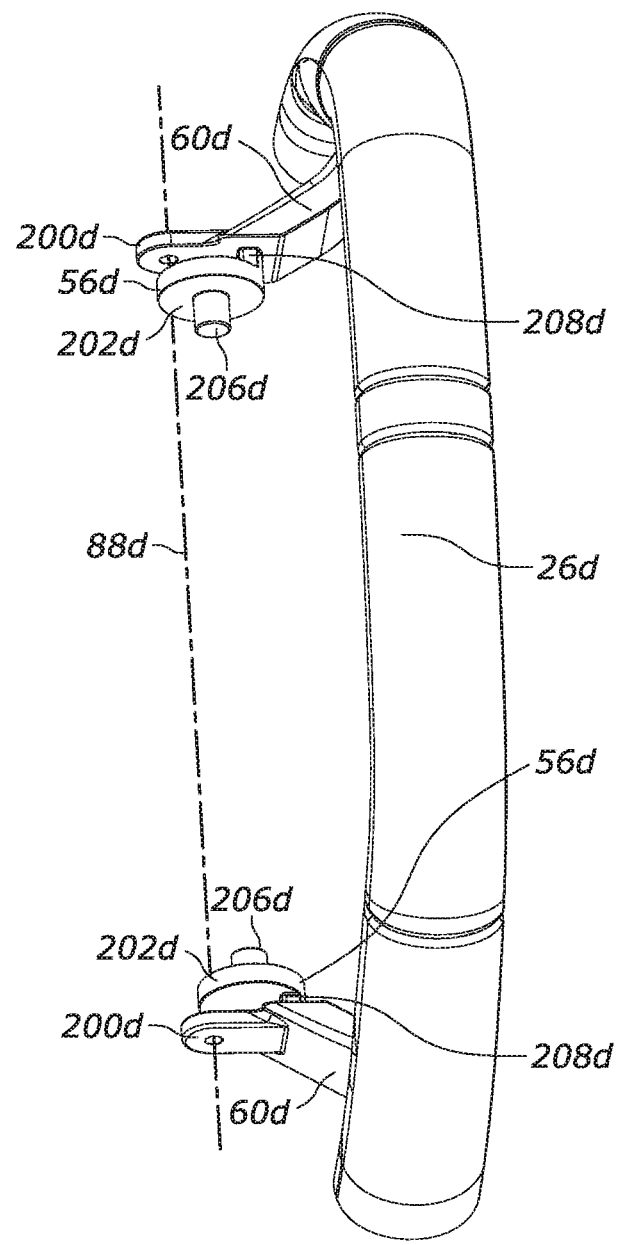
FIG. 17 is a perspective top view of an element of the steering wheel assembly of FIG. 12.
Figure 18:
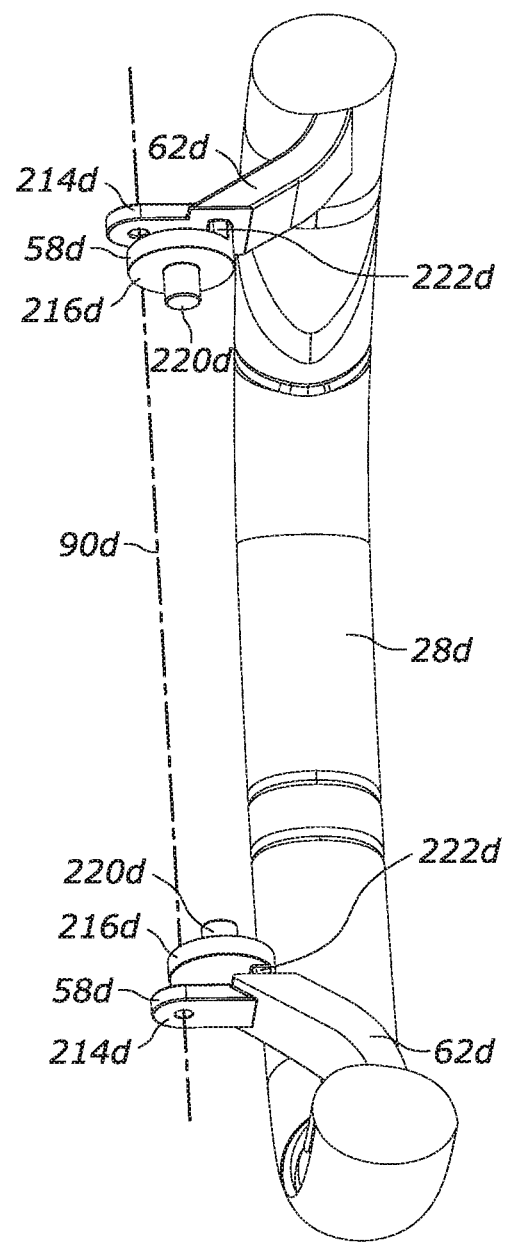
FIG. 18 is a perspective top view of an element of the steering wheel assembly of FIG. 12.
Figure 19:
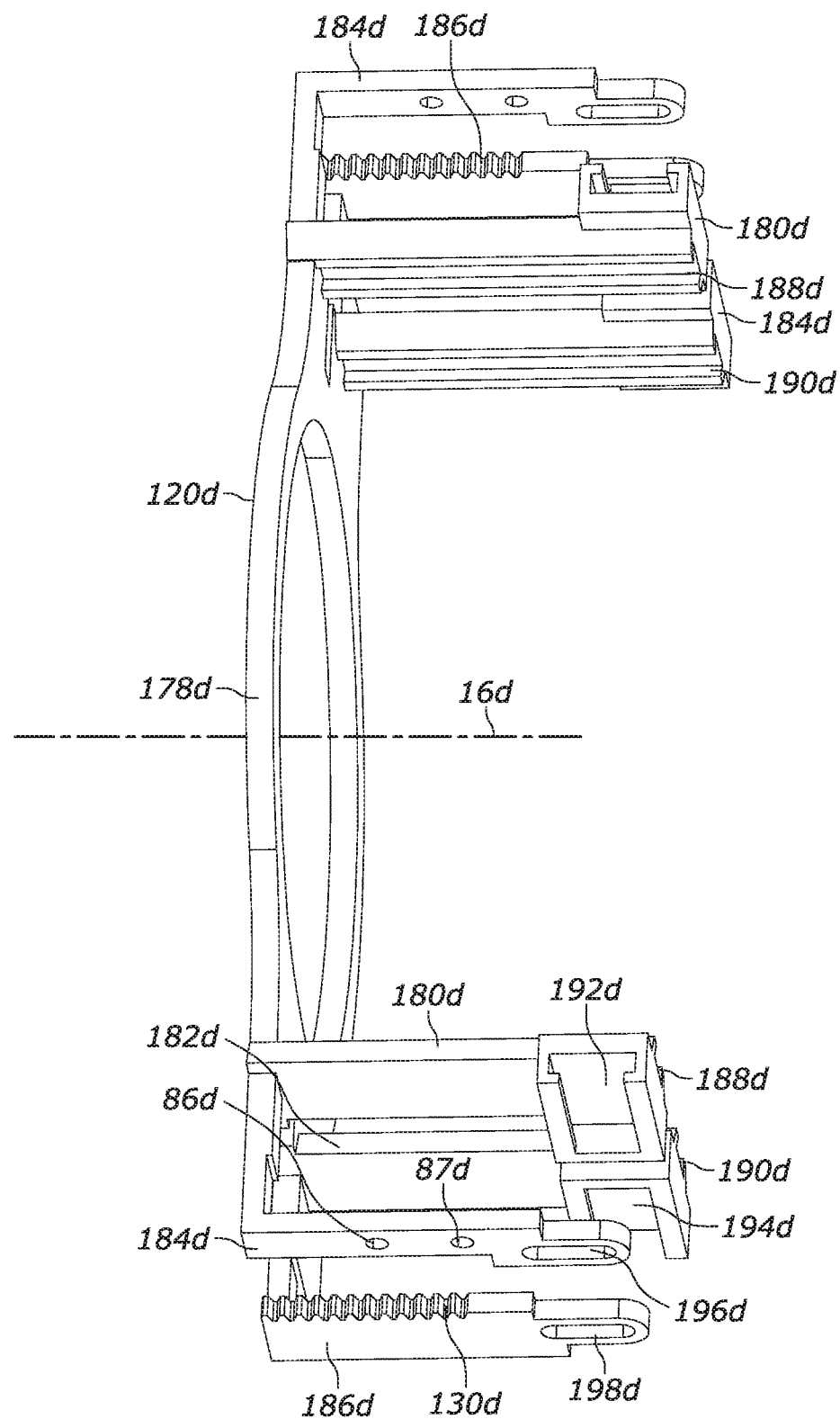
FIG. 19 is a perspective top view of an element of the steering wheel assembly of FIG. 12.

The steering wheel 14d can be moved between the steering and folded positions by first and second switching portions 48d, 50d of the steering wheel assembly 10d. As shown in FIGS. 12-14, the first switching portion 48d is on the first side 44d of the support member 42d. The second switching portion 50d is on the second side 46d of the support member 42d. The second switching portion 50d can mirror at least a portion of the first switching portion 48d. Common features that are present in both the first and second switching portions 48d, 50d operate in a similar manner. Thus, for the sake of brevity, only the first switching portion 48d will be described below.

As shown in FIGS. 12 and 14, the first switching portion 48d includes a gear drive 52d. The gear drive 52d may be rotated by a motor 53d. The gear drive 52d is rotatably supported on the first side 44d of the support member 42d. The gear drive 52d includes gear teeth 54d.

As shown in FIG. 12-16, the first support arm 116d includes a track arm 164d that extends from the base portion 114d of the support member 42d. The first track arm 164d extends generally parallel to the steering axis 16d. First and second guide projections 166d, 168d extend from the track arm 164d. The first support arm 116d also includes a support pivot arm 170d that extends generally parallel to the track arm 164d and the steering axis 16d. First and second support arm openings 174d, 176d extend through the support pivot arm 170d. The first and second support arm openings 174d, 176d extend at an acute angle relative to each other.

As shown in FIGS. 12-15 and 19, a carriage 120d has a carriage base portion 178d and first and second guide arms 180d, 182d extending from the carriage base portion. The first and second guide arms 180d, 182d extend generally parallel to each other and the steering axis 16d. The first guide arm 180d has a first guide track 188d that slides on the first guide projection 166d of the track arm 164d. The second guide arm 182d has a second guide track 190d that slides on the second guide projection 168d of the track arm 164d. A first linear track 192d extends on an opposite side of the first guide arm 180d and transverse to the first guide track 188d and the steering axis 16d. A second linear track 194d extends on an opposite side of the second guide arm 182d and transverse to the second guide track 190d and the steering axis 16d.

First and second carriage pivot arms 184d, 186d extend from the carriage base portion 178d generally parallel to the first and second guide arms 180d, 182d. The second carriage pivot arm 186d has teeth 130d that engage the gear teeth 54d in a manner similar to that of a rack and pinion. A first slot 196d extends through the first carriage pivot arm 184d. A second slot 198d extends through the second pivot arm 186d.

As shown in FIGS. 12-19, the first mounting portion 60d is fixedly connected to a first transfer member 56d. The first transfer member 56d includes spaced apart first and second portions 200d, 202d. A connecting portion 208d interconnects the first and second portions 200d, 202d. The second portion 202d includes a connecting projection 206d. The first portion 200d is pivotably connected to the first carriage pivot arm 184d by a first pin 156d. The first pin 156d extends through an opening in the first portion 200d and through the first slot 196d. The first pin 156d slides along the first slot 196d. At least a portion of the first carriage pivot arm 184d extends between the first and second portions 200d, 202d of the first transfer member 56d.

A first rotator member 160d connects the second portion 202d of the first transfer member 56d to the first guide arm 180d of the carriage 120d. The first rotator member 160d slides along the first linear track 192d on the first guide arm 180d. The first rotator member 160d has a cylindrical connecting portion 210d extending through the first support arm opening 174d of the support pivot arm 170d. The connecting projection 206d of the first transfer member 56d extends into a pocket 212d of the connection portion 210d. The first transfer member 56d is rotatable relative to the first rotator member 160d.

The second mounting portion 62d is fixedly connected to a second transfer member 58d. The second transfer member 58d includes spaced apart first and second portions 214d, 216d. A connecting portion 222d interconnects the first and second portions 214d, 216d. The second portion 216d includes a connecting projection 220d. The first portion 214d is pivotably connected to the second carriage pivot arm 186d by a second pin 158d. The second pin 158d extends through an opening in the first portion 214d and through the second slot 198d. The second pin 158d slides along the second slot 198d. At least a portion of the second carriage pivot arm 186d extends between the first and second portions 214d, 216d of the second transfer member 58d.

A second rotator member 162d connects the second portion 216d of the second transfer member 58d to the second guide arm 182d of the carriage 120d. The second rotator member 162d slides along the second linear track 194d on the second guide arm 182d. The second rotator member 162d has a cylindrical connecting portion 224d extending through the second support arm opening 176d of the support pivot arm 170d. The connecting projection 220d of the second transfer member 56d extends into a pocket 226d of the connection portion 224d. The second transfer member 58d is rotatable relative to the second rotator member 162d.

As shown in FIGS. 12-16 and 19, the support member 42d has a locking member 84d. The locking member 84d can be an axially movable pin electrically connected to the same controller that the gear drive 52d is connected to or to a separate controller. When the steering wheel 14d is in the steering position, the locking member 84d can be actuated to engage a steering position locking member 86d on the first carriage pivot arm 184d to prevent the steering wheel from moving to the folded position. The locking member 86d may be a first opening in the first carriage pivot arm 184d into which the pin 84d extends. When the steering wheel 14d is in the folded position, the locking member 84d can be actuated to engage a folded position locking member 87d on the first carriage pivot arm 184d to prevent the steering wheel from moving to the steering position. The locking member 87d may be a second opening in the first carriage pivot arm 184d into which the pin 84d extends.

As shown in FIGS. 12-14, with the steering wheel 14d in the steering position, actuation of the gear drive 52d causes the first and second rim portions 26d, 28d to pivot relative to the support member 42d from the steering position to the folded position. The gear drive 52d rotates in the clockwise direction CW relative to the support member 42d upon actuation. The carriage 120d linearly moves in a first direction FD relative to the support member 42d.

The carriage 120d causes the connecting portion 210d of the first rotator member 160d to slide along the first support arm opening 174d. Walls 228d defining the first support arm opening 174d urge the first rotator member 160d to also move along the first linear track 192d. The first rotator member 160d rotates the first transfer member 56d in the counterclockwise direction CCW about the first pin 156d relative to the carriage 120d. The first pin 156d slides along the first slot 196d as the carriage 120d moves relative to the support member 42d.

The first mounting portion 60d pivots in the counterclockwise direction CCW relative to the carriage 120d. As the first mounting portion 60d pivots relative to the carriage 120d, the first rim portion 26d pivots about a first pivot axis 88d in the counterclockwise direction CCW relative to the carriage from the steering position to the folded position.

The carriage 120d also causes the connecting portion 224d of the second rotator member 162d to slide along the second support arm opening 176d. Walls 230d defining the second support arm opening 176d urge the second rotator member 162d to also move along the second linear track 194d. The rotator member 162d rotates the second transfer member 58d in the clockwise direction CW about the second pin 158d relative to the carriage 120d. The second pin 158d slides along the second slot 198d as the carriage 120d moves relative to the support member 42d.

The second mounting portion 62d pivots in the clockwise direction CW relative to the carriage 120d. As the second mounting portion 62d pivots relative to the carriage 120d, the second rim portion 28d pivots about a second pivot axis 90d in the clockwise direction CW relative to the carriage 120d from the steering position to the folded position. The first and second pivot axes 88d, 90d extend generally parallel to each other and transverse to the steering axis 16d.

The gear drive 52d can be actuated to reverse the above described process and cause the first and second rim portions 26d, 28d to pivot about the first and second pivot axes 88d, 90d, respectively, relative to the support member 42d from the folded position to the steering position.

Figure 20:
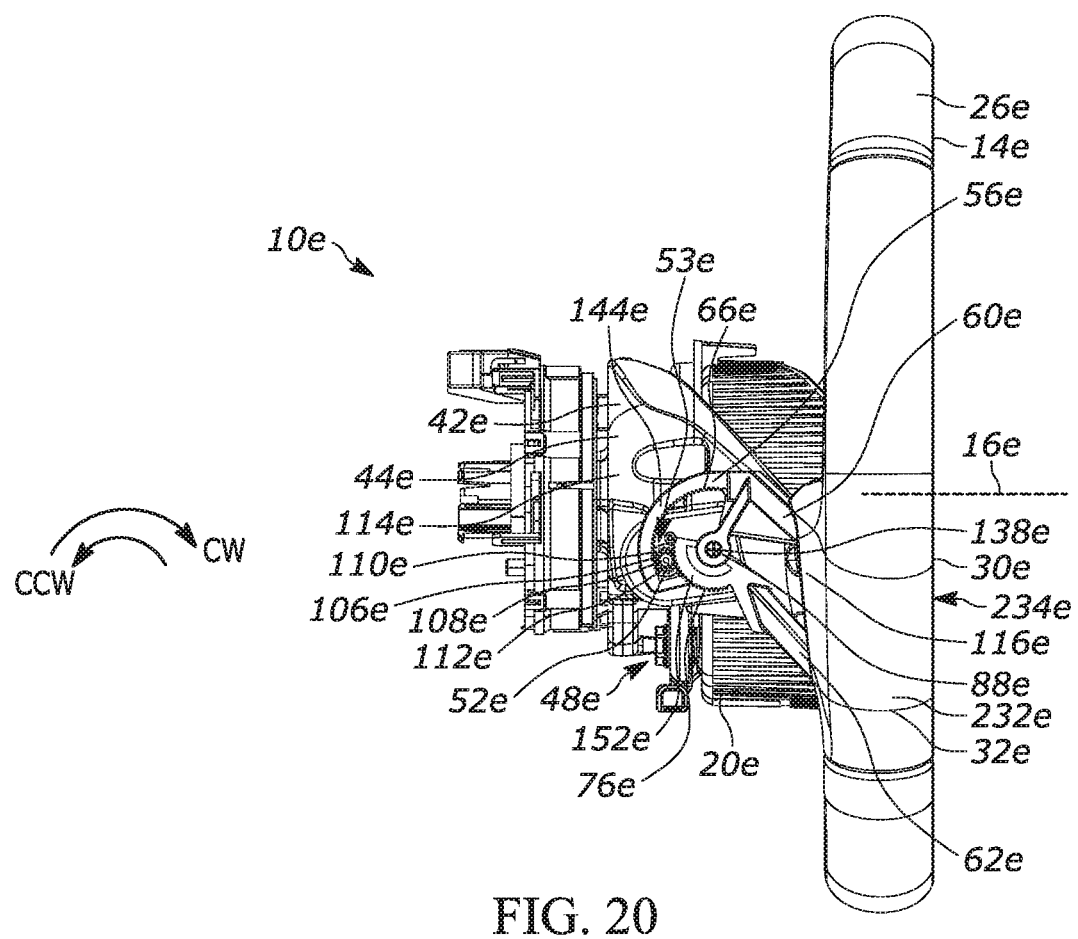
FIG. 20 is a side view of a portion of an example configuration of the steering wheel assembly of FIG. 1, including the steering wheel in the first position.
Figure 21:
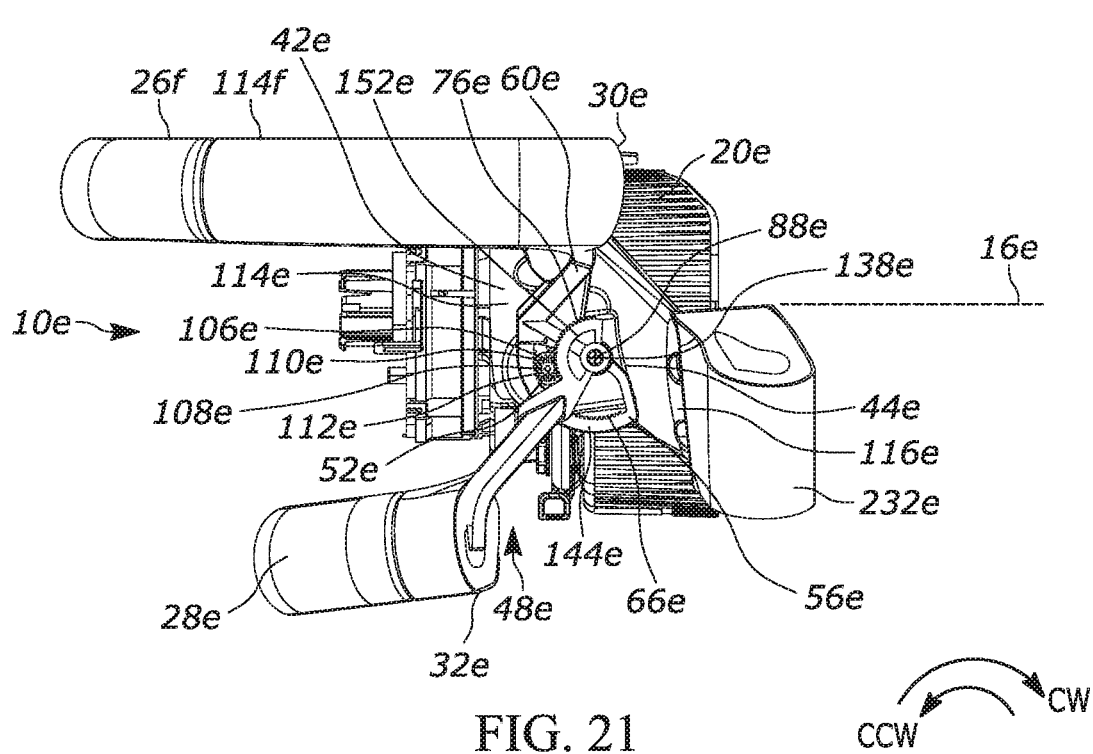
FIG. 21 is a side view of a portion of the example configuration of the steering wheel assembly of FIG. 20, including the steering wheel in the second position.
Figure 22:
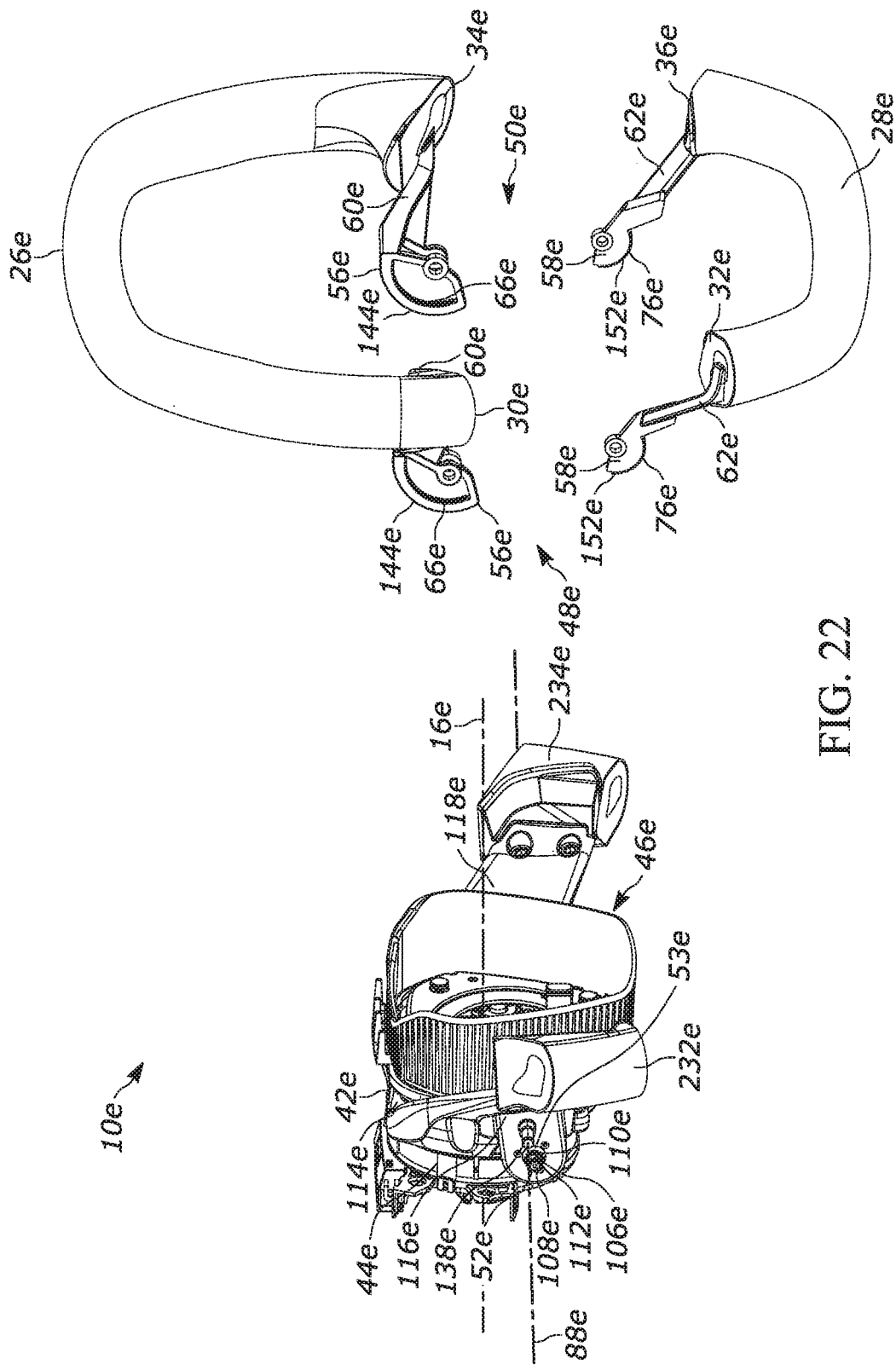
FIG. 22 is an exploded view of the steering wheel assembly of FIG. 20.

FIGS. 20-22 depict an example steering wheel assembly 10e. The steering wheel assembly 10e includes a support member 42e having a base portion 114e connectable to a steering column that extends through the dashboard or support surface 15. First and second support arms 116e, 118e extend from the base portion 114e on first and second sides 44e, 46e, respectively, of the support member 42e.

A first rim portion 26e of a steering wheel 14e has first and second ends 30e, 34e. The first end 30e has a first mounting portion 60e for operably connecting the first end to the first support arm 116e. The second end 34e has another first mounting portion 60e for operably connecting the second end to the second support arm 118e. A second rim portion 28e of the steering wheel 14e has first and second ends 32e, 36e. The first end 32e has a second mounting portion 62e for operably connecting the first end to the first support arm 116e. The second end 34e has another second mounting portion 62e for operably connecting the second end to the second support arm 118e.

A first central rim portion 232e is connected to the first support arm 116e. The first central rim portion 232e extends between the first ends 30e, 32e of the first and second rim portions 26e, 28e when the first and second rim portions are in the steering position. A second central rim portion 234e is connected to the second support arm 118e. The second central rim portion 234e extends between the second ends 34e, 36e of the first and second rim portions 26e, 28e when the first and second rim portions are in the steering position. Alternatively, the first and second central rim portions 232e, 234e can be formed as one piece with the first rim portion 26e and/or the second rim portion 28e.

The steering wheel 14e can be moved between the steering and folded positions by first and second switching portions 48e, 50e of the steering wheel assembly 10e. As shown in FIGS. 20-21, the first switching portion 48e is on the first side 44e of the support member 42e. The second switching portion 50e is on the second side 46e of the support member 42e. The second switching portion 50e can mirror at least a portion of the first switching portion 48e. Common features that are present in both the first and second switching portions 48e, 50e operate in a similar manner. Thus, for the sake of brevity, only the first switching portion 48e will be described below.

As shown in FIGS. 20-22, the first switching portion 48e includes a gear drive 52e. The gear drive 52e may be rotated by a motor 53e. The gear drive 52e has a first gear 106e and a second gear 108e. The first gear 106e is rotatably supported on the first side 44e of the support member 42e. The second gear 108e is connected to the first gear 106e so that the first gear is between the first side 44e of the support member 42e and the second gear. The first and second gears 106e, 108e of the gear drive 52e include gear teeth 110e, 112e.

A first transfer member 56e is pivotably connected to the support member 42e by a pin 138e. The first transfer member 56e is fixedly connected to the first mounting portion 60e. Therefore, the first rim portion 26e is pivotably connected to the support member 42e. An arcuate portion 144e of the first transfer member 56e has internal teeth 66e that engage the gear teeth 110e of the first gear 106e.

A second transfer member 58e is pivotably connected to the support member 42e by the pin 138e. The second transfer member 58e is fixedly connected to the second mounting portion 62e. Therefore, the second rim portion 28e is pivotably connected to the support member 42e. A semicircular portion 152e of the second transfer member 58e has external teeth 76e that engage the gear teeth 112e of the second gear 108e.

As shown in FIGS. 20-21, with the steering wheel 14e in the steering position, actuation of the gear drive 52e causes the first and second rim portions 26e, 28e to pivot relative to the support member 42e from the steering position to the folded position. The first and second gears 106e, 108e of the gear drive 52e rotate in the counterclockwise direction CCW relative to the support member 42e upon actuation. The first transfer member 56e rotates in the counterclockwise direction CCW about the pin 138e relative to the support member 42e. The first mounting portion 60e pivots in the counterclockwise direction CCW relative to the support member 42e. As the first mounting portion 60e pivots relative to the support member 42e, the first rim portion 26e pivots about a pivot axis 88e in the counterclockwise direction CCW relative to the support member 42e from the steering position to the folded position.

The second transfer member 58e rotates in the clockwise direction CW about the pin 138e relative to the support member 42e. The second mounting portion 62e pivots in the clockwise direction CW relative to the support member 42e. As the second mounting portion 62e pivots relative to the support member 42e, the second rim portion 28e pivots about the pivot axis 88e in the clockwise direction CW relative to the support member 42e from the steering position to the folded position.

The gear drive 52e can be actuated to reverse the above described process and cause the first and second rim portions 26e, 28e to pivot about the pivot axis 88e relative to the support member 42e from the folded position to the steering position.

FIGS. 23-26 depict an example steering wheel assembly 10f. The steering wheel assembly 10f includes a support member 42f having a base portion 114f connectable to a steering column that extends through the dashboard or support surface 15. First and second support arms 116f, 118f extend from the base portion 114f on first and second sides 44f, 46f, respectively, of the support member 42f. The first and second support arms 116f, 118f extend generally parallel to each other and the steering axis 16f.

A first rim portion 26f of a steering wheel 14f has first and second ends 30f, 34f. The first end 30f has a first mounting portion 60f for operably connecting the first end to the first support arm 116f. The second end 34f has another first mounting portion 60f for operably connecting the second end to the second support arm 118f. A second rim portion 28f of the steering wheel 14f has first and second ends 32f, 36f. The first end 32f has a second mounting portion 62f for operably connecting the first end to the first support arm 116f. The second end 34f has another second mounting portion 62f for operably connecting the second end to the second support arm 118f.

Figure 23:
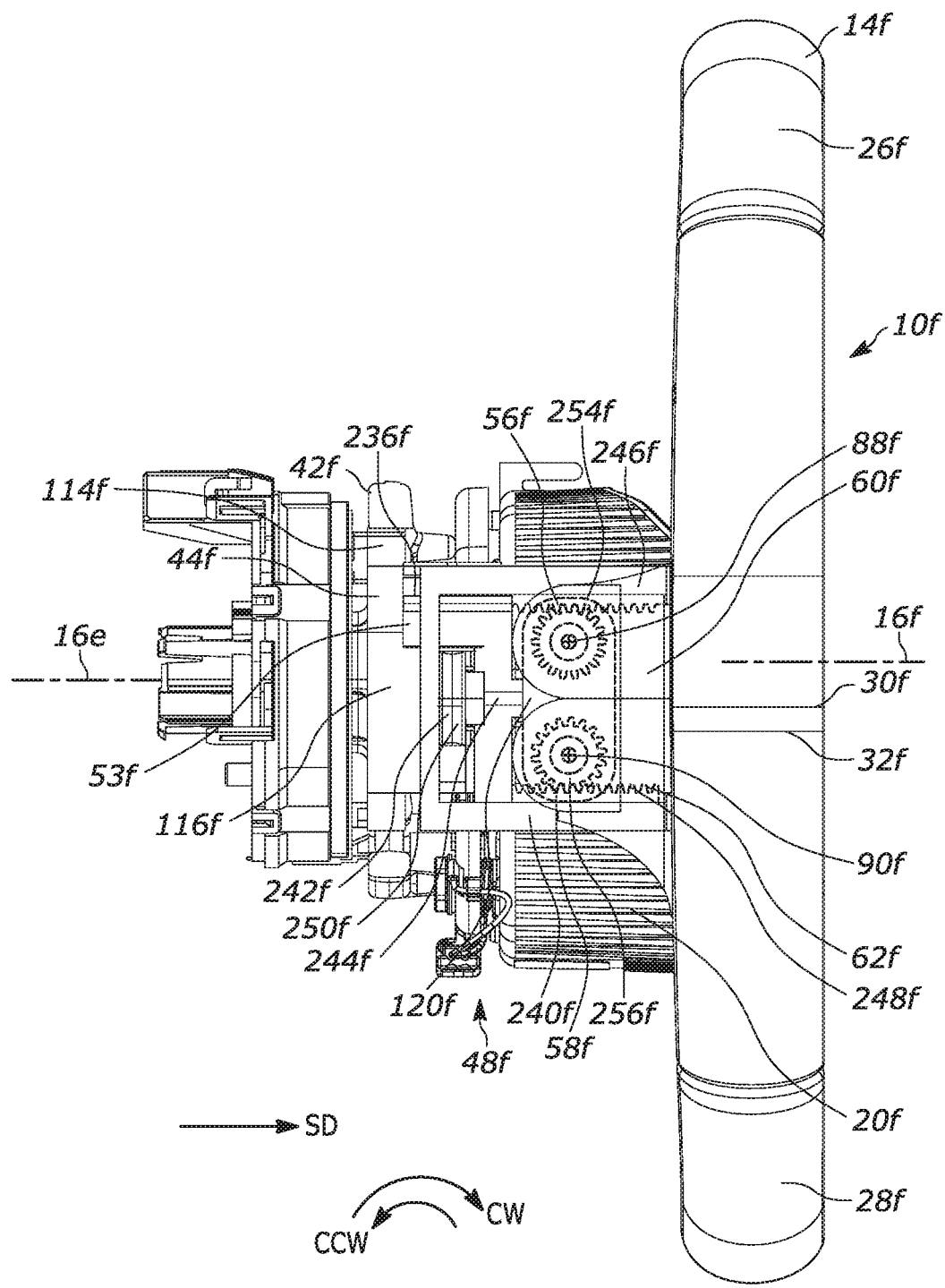
FIG. 23 is a side view of a portion of an example configuration of the steering wheel assembly of FIG. 1, including the steering wheel in the first position.
Figure 24:
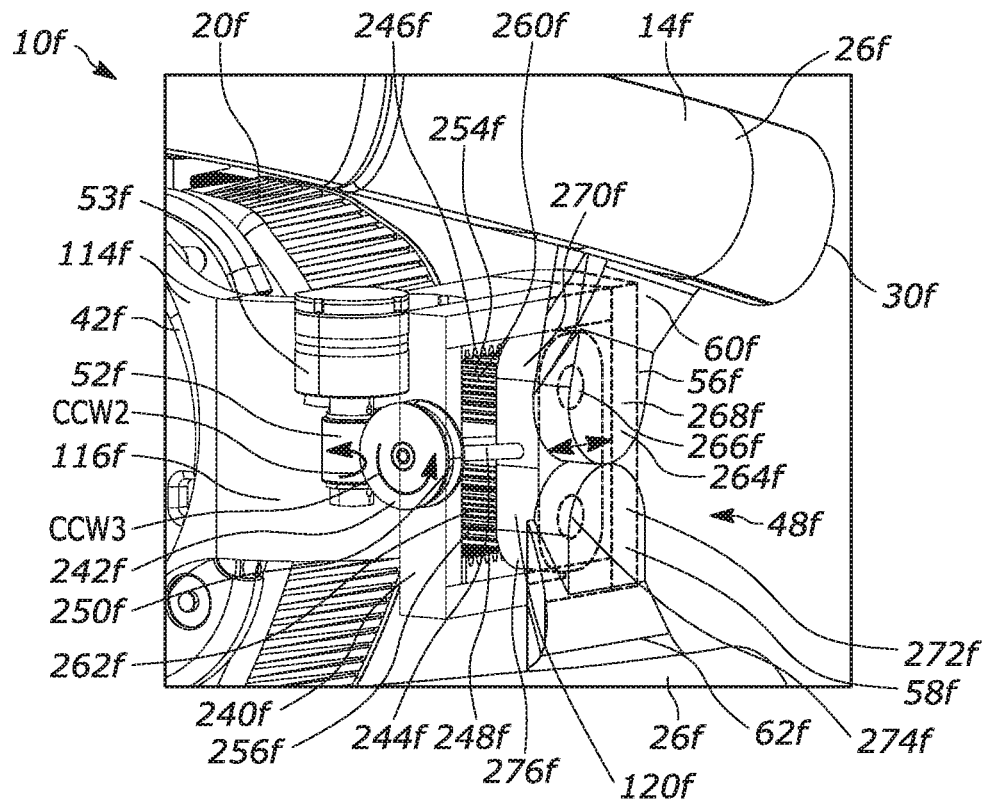
FIG. 24 is a perspective side view of a portion of the example configuration of the steering wheel assembly of FIG. 23, including the steering wheel in a position that is between the first and second positions.
Figure 25:
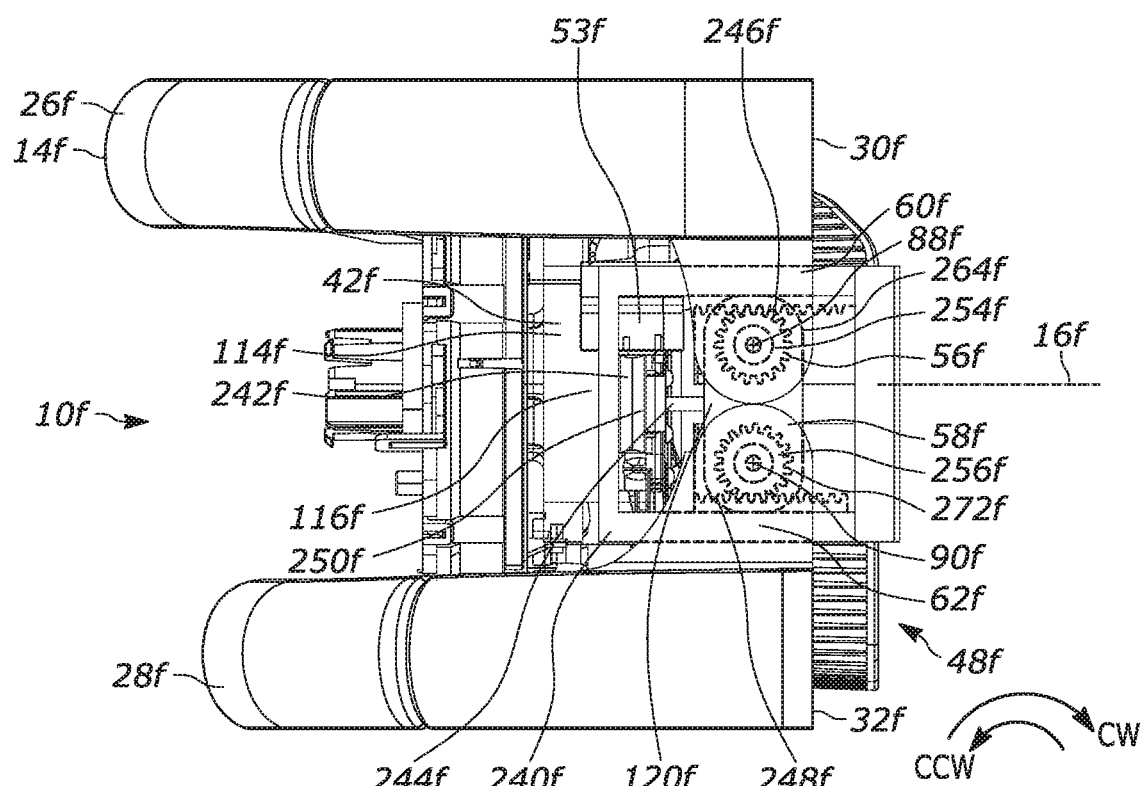
FIG. 25 is a side view of a portion of the example configuration of the steering wheel assembly of FIG. 23, including the steering wheel in the second position.
Figure 26:
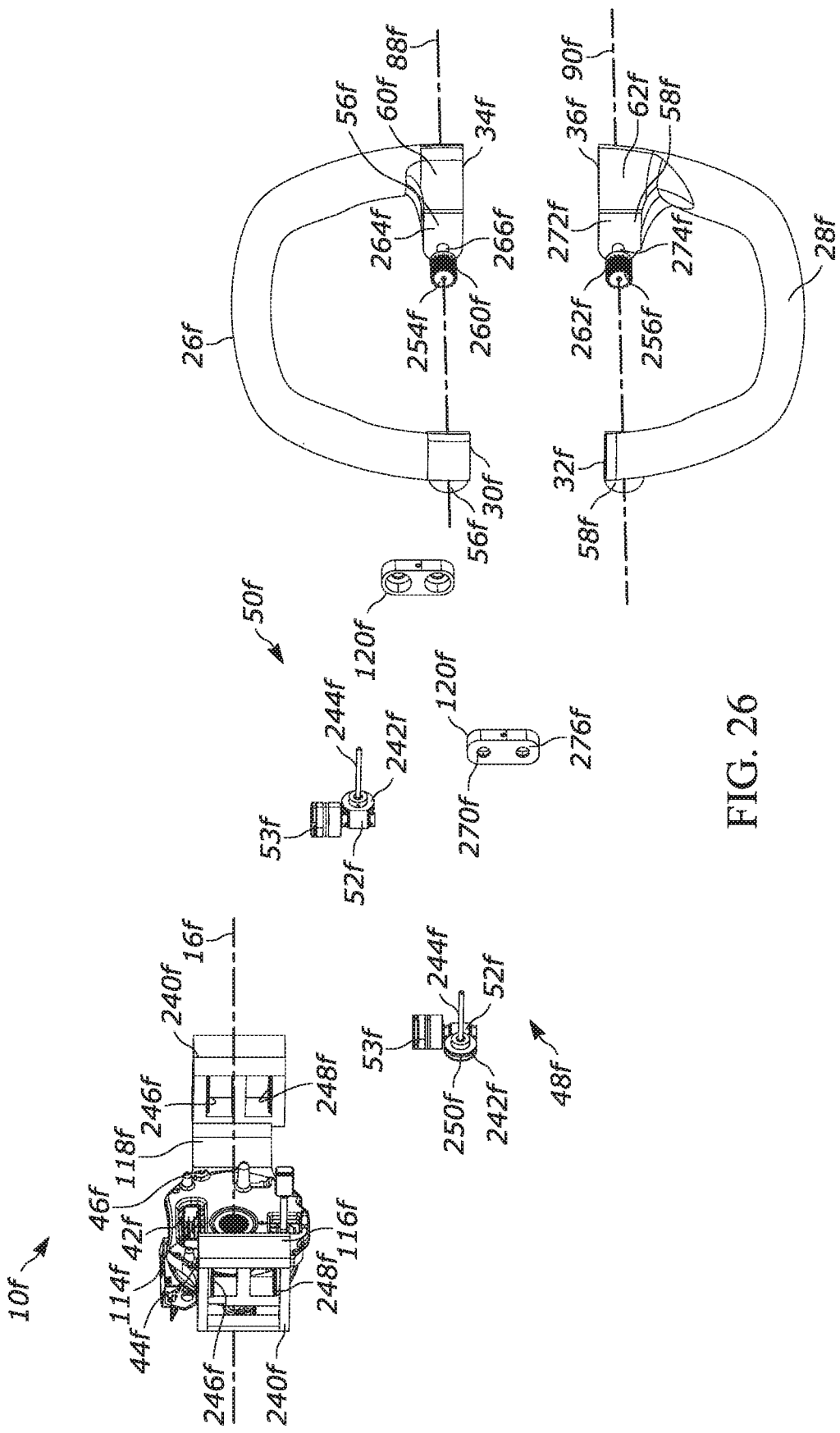
FIG. 26 is an exploded view of the steering wheel assembly of FIG. 23.

The steering wheel 14f can be moved between the steering and folded positions by first and second switching portions 48f, 50f of the steering wheel assembly 10f. As shown in FIGS. 23-25, the first switching portion 48f is on the first side 44f of the support member 42f. The second switching portion 50f is on the second side 46f of the support member 42f. The second switching portion 50f can mirror at least a portion of the first switching portion 48f. Common features that are present in both the first and second switching portions 48f, 50f operate in a similar manner. Thus, for the sake of brevity, only the first switching portion 48f will be described below.

As shown in FIGS. 23-26, the first switching portion 48f includes a gear drive 52f in the form of a worm screw. The gear drive 52f may be rotated by a motor 53f. The gear drive 52f is rotatable supported on the first support arm 116f.

The first switching portion 48f further includes a rack 240f. The rack 240f is connected to the first support arm 116f. The rack 240f can be formed as a single piece with the first support arm 116f or formed as a separate piece that is connected to the first support arm. The rack 240f has first and second rack teeth 246f, 248f that extend generally parallel to the steering axis 16f. The first and second rack teeth 246f, 248f are spaced from and face one another.

A worm wheel 242f is rotatably connected to the rack 240f. The worm wheel 242f has teeth 250f that engage the gear drive 52f. A leadscrew 244f rotates with the worm wheel 242f relative to the rack 240f. A carriage 120f threadingly engages the leadscrew 244f.

A first transfer member 56f is fixedly connected to the first mounting portion 60f. The first transfer member 56f has a first portion 264f and a second portion 266f extending from the first portion. The first portion 264f engages the carriage 120f. The second portion 266f extends through a first end 270f of the carriage 120f and is fixedly attached to a first gearwheel 254f. The first gearwheel 254f has teeth 260f that engage the first rack teeth 246f. The first mounting portion 60f, the first transfer member 56f, the first gearwheel 254f and the first rim portion 26f can be formed together as a single piece or as separate pieces that are connected to one another.

A second transfer member 58f is fixedly connected to the second mounting portion 62f. The second transfer member 58f has a first portion 272f and a second portion 274f extending from the first portion. The first portion 272f engages the carriage 120f. The second portion 274f extends through a second end 276f of the carriage 120f and is fixedly attached to a second gearwheel 256f. The second gearwheel 256f has teeth 262f that engage the second rack teeth 248f. The second mounting portion 62f, the second transfer member 58f, the second gearwheel 256f and the second rim portion 28f can be formed together as a single piece or as separate pieces that are connected to one another.

As shown in FIGS. 23-25, with the steering wheel 14f in the steering position, actuation of the gear drive 52f causes the first and second rim portions 26f, 28f to pivot relative to the support member 42f from the steering position to the folded position. The gear drive 52f rotates in a second counterclockwise direction CCW2 relative support member 42*f* upon actuation. The gear drive 52*f* rotates the worm wheel 242*f* in a third counterclockwise direction CCW3 relative to the rack 240*f*. The leadscrew 244*f* rotates in the third counterclockwise direction CCW3 with the worm wheel 242*f*.

The carriage 120*f* linearly moves in a second direction SD along the leadscrew 244*f*. The carriage 120*f* moves the first transfer member 56*f* in the second direction SD. The first transfer member 56*f* moves the first gearwheel 254*f* in the second direction SD along the first rack teeth 246*f*. The first gearwheel 254*f* rotates in the counterclockwise direction CCW relative to the carriage 120*f*. The first transfer member 56*f* rotates in the counterclockwise direction CCW relative to the carriage 120*f*. The first mounting portion 60*f* pivots in the counterclockwise direction CCW relative to the carriage 120*f*. As the first mounting portion 60*f* pivots relative to the carriage 120*f*, the first rim portion 26*f* pivots about a first pivot axis 88*f* in the counterclockwise direction CCW relative to the carriage 120*f* from the steering position to the folded position.

The carriage 120*f* also moves the second transfer member 58*f* in the second direction SD. The second transfer member 58*f* moves the second gearwheel 256*f* in the second direction SD along the second rack teeth 248*f*. The second gearwheel 256*f* rotates in the clockwise direction CW relative to the carriage 120*f*. The second transfer member 58*f* rotates in the clockwise direction CW relative to the carriage 120*f*. The second mounting portion 62*f* pivots in the clockwise direction CW relative to the carriage 120*f*. As the second mounting portion 62*f* pivots relative to the carriage 120*f*, the second rim portion 28*f* pivots about a second pivot axis 90*f* in the clockwise direction CW relative to the carriage 120*f* from the steering position to the folded position. The first and second pivot axes 88*f*, 90*f* extend generally parallel to each other and transverse to the steering axis 16*f*.

The gear drive 52*f* can be actuated to reverse the above described process and cause the first and second rim portions 26*f*, 28*f* to pivot about the first and second pivot axes 88*f*, 90*f*, respectively, relative to the carriage 120*f* from the folded position to the steering position.

FIGS. 27-31 depict an example steering wheel assembly 10*g*. The steering wheel assembly 10*g* includes a support member 42*g* having a base portion 114*g* connectable to a steering column that extends through the dashboard or support surface 15. First and second support arms 116*g*, 118*g* extend from the base portion on first and second sides 44*g*, 46*g*, respectively, of the support member 42*g*. The first and second support arms 116*g*, 118*g* extend generally parallel to each other and the steering axis 16*g*.

A first rim portion 26*g* of a steering wheel 14*g* has first and second ends 30*g*, 34*g*. The first end 30*g* has a first mounting portion 60*g* pivotably connected to the first end to the first support arm 116*g*. The second end 34*g* has another first mounting portion 60*g* connecting the second end to the second support arm 118*g*. Therefore, the first rim portion 26*g* is pivotably connected to the first and second support arms 116*g*, 118*g*. The first mounting portions 60*g* and the first rim portion 26*g* can be formed together as a single piece or as separate pieces that are connected to one another.

A second rim portion 28*g* of the steering wheel 14*g* has first and second ends 32*g*, 36*g*. The first end 32*g* has a second mounting portion 62*g* connecting the first end to the first support arm 116*g*. The second end 34*g* has another second mounting portion 62*g* connecting the second end to the second support arm 118*g*. Therefore, the second rim portion 28*g* is pivotably connected to the first and second support arms 116*g*, 118*g*. The second mounting portions 62*g* and the second rim portion 28*g* can be formed together as a single piece or as separate pieces that are connected to one another.

A first central rim portion 232*g* is connected to the first support arm 116*g*. A second central rim portion 234*g* is connected to the second support arm 118*g*. Alternatively, the first and second central rim portions 232*g*, 234*g* can be formed as one piece with the first rim portion 26*g* and/or the second rim portion 28*g*.

Figure 27:
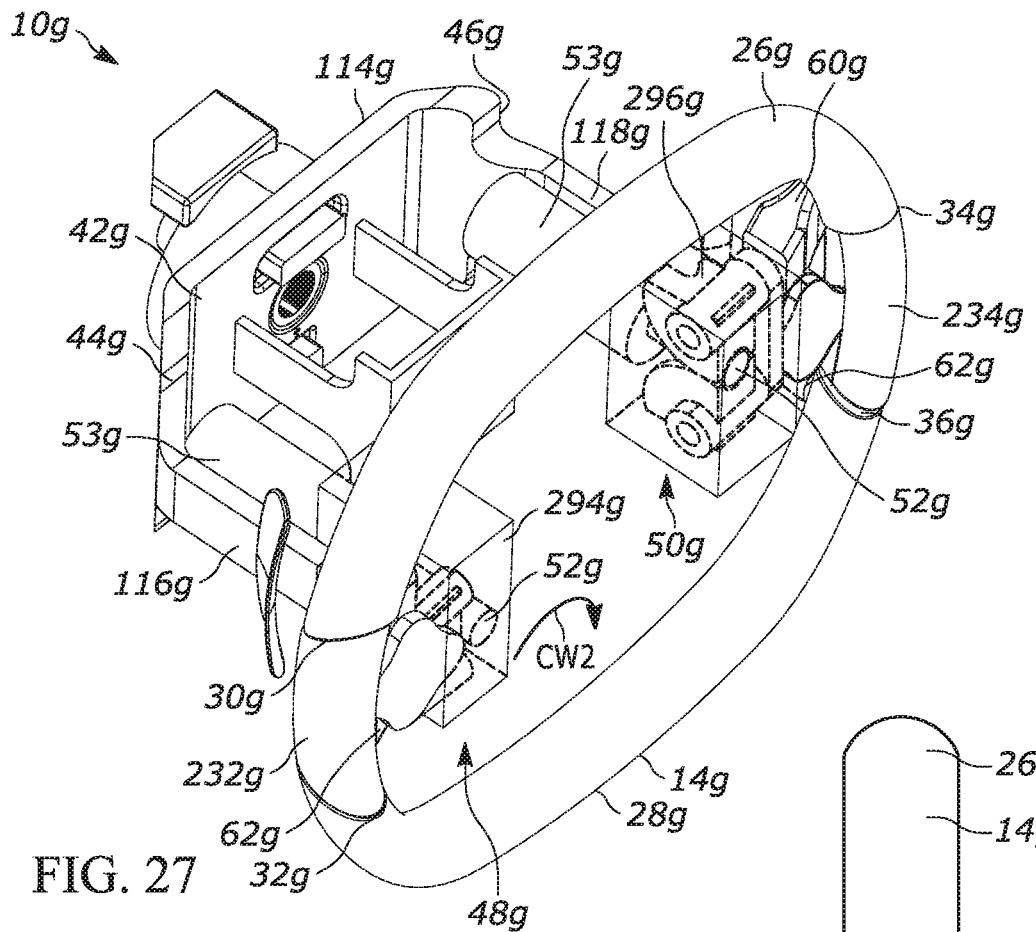
FIG. 27 is a partial perspective view of an example configuration of the steering wheel assembly of FIG. 1, including the steering wheel in the first position.
Figure 28:
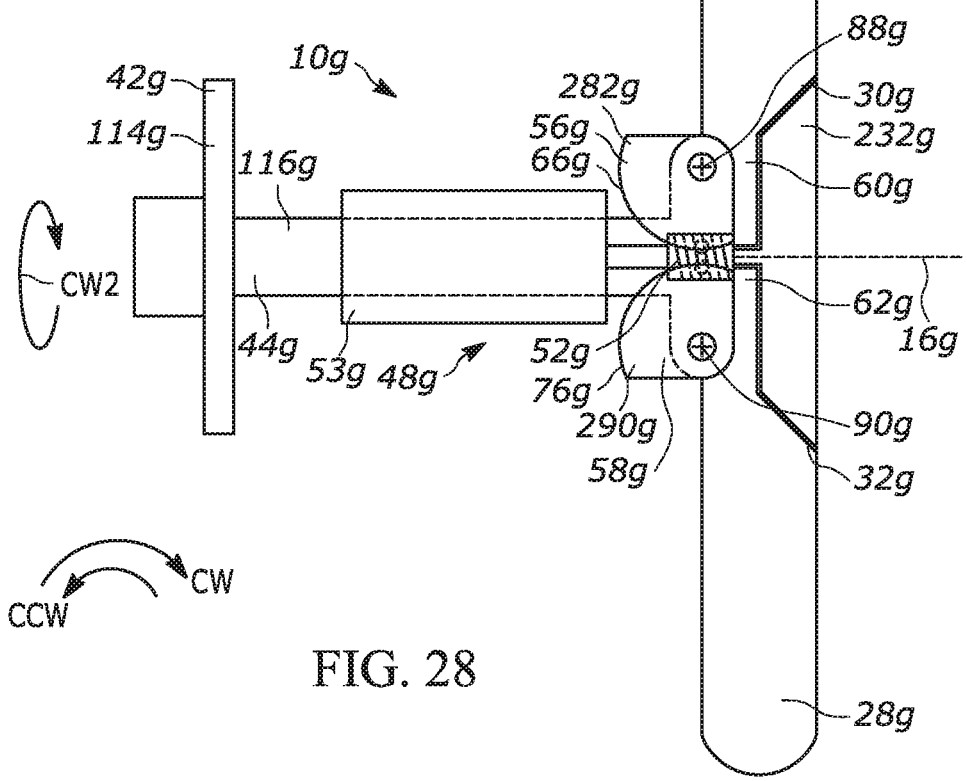
FIG. 28 is a schematic side view of the example configuration of the steering wheel assembly of FIG. 27, including the steering wheel in the first position.
Figure 29:
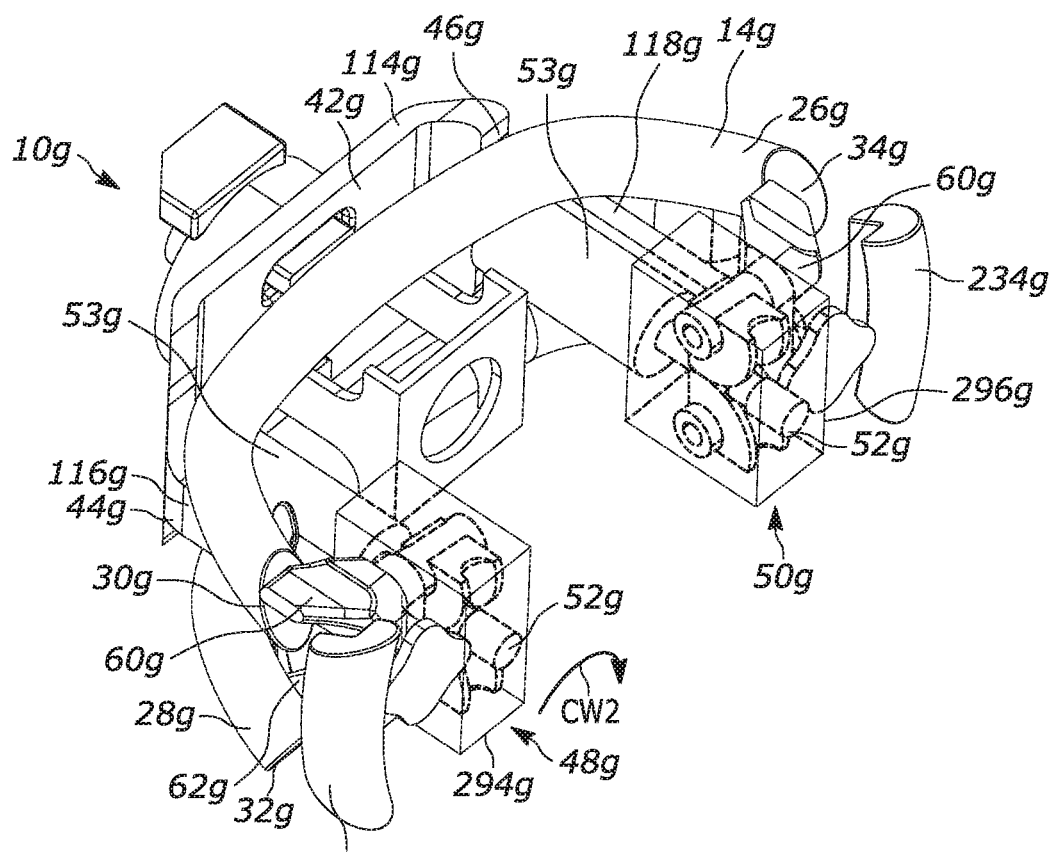
FIG. 29 is a partial perspective view of the example configuration of the steering wheel assembly of FIG. 27, including the steering wheel in the second position.
Figure 30:
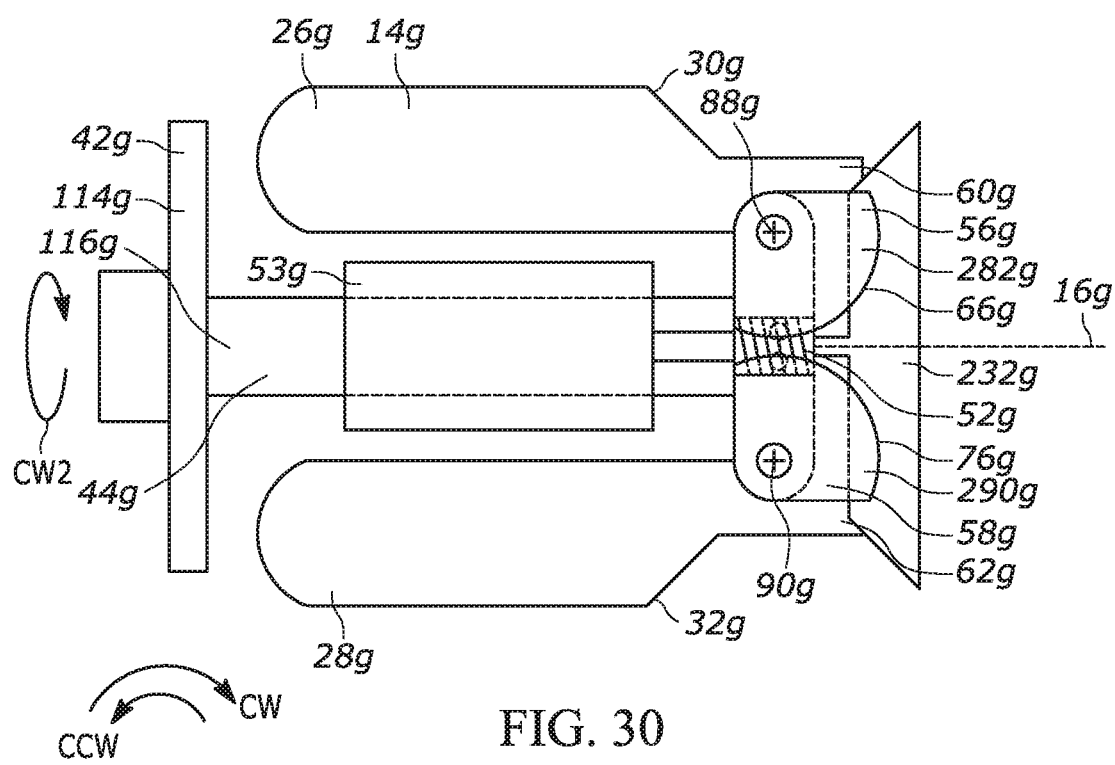
FIG. 30 is a schematic side view of the example configuration of the steering wheel assembly of FIG. 29, including the steering wheel in the second position.

The steering wheel 14*g* can be moved between the steering and folded positions by first and second switching portions 48*g*, 50*g* of the steering wheel assembly 10*g*. As shown in FIGS. 27 and 29, the first switching portion 48*g* is connected to the first support arm 116*g*. The second switching portion 50*g* is connected to the second support arm 118*g*. The first and second switching portions 48*g*, 50*g* mirror one another and operate in a similar manner. Thus, for the sake of brevity, only the first switching portion 48*g* will be described below.

As shown in FIGS. 27-31, the first switching portion 48*g* includes a gear drive 52*g* in the form of a worm screw. The gear drive 52*g* may be rotated by a motor 53*g*. The gear drive 52*g* is rotatable supported on the first support arm 116*g*.

A first transfer member 56*g* is pivotably connected to the first support arm 116*g*. A curved portion 282*g* of the first transfer member 56*g* has teeth 66*g* that engage the gear drive 52*g*. The first transfer member 56*g* is connected to the first mounting portion 60*g*.

A second transfer member 58*g* is pivotably connected to the first support arm 116*g*. A curved portion 290*g* of the second transfer member 58*g* has teeth 76*g* that engage the gear drive 52*g*. The second transfer member 58*g* is connected to the second mounting portion 62*g*.

Figure 31:
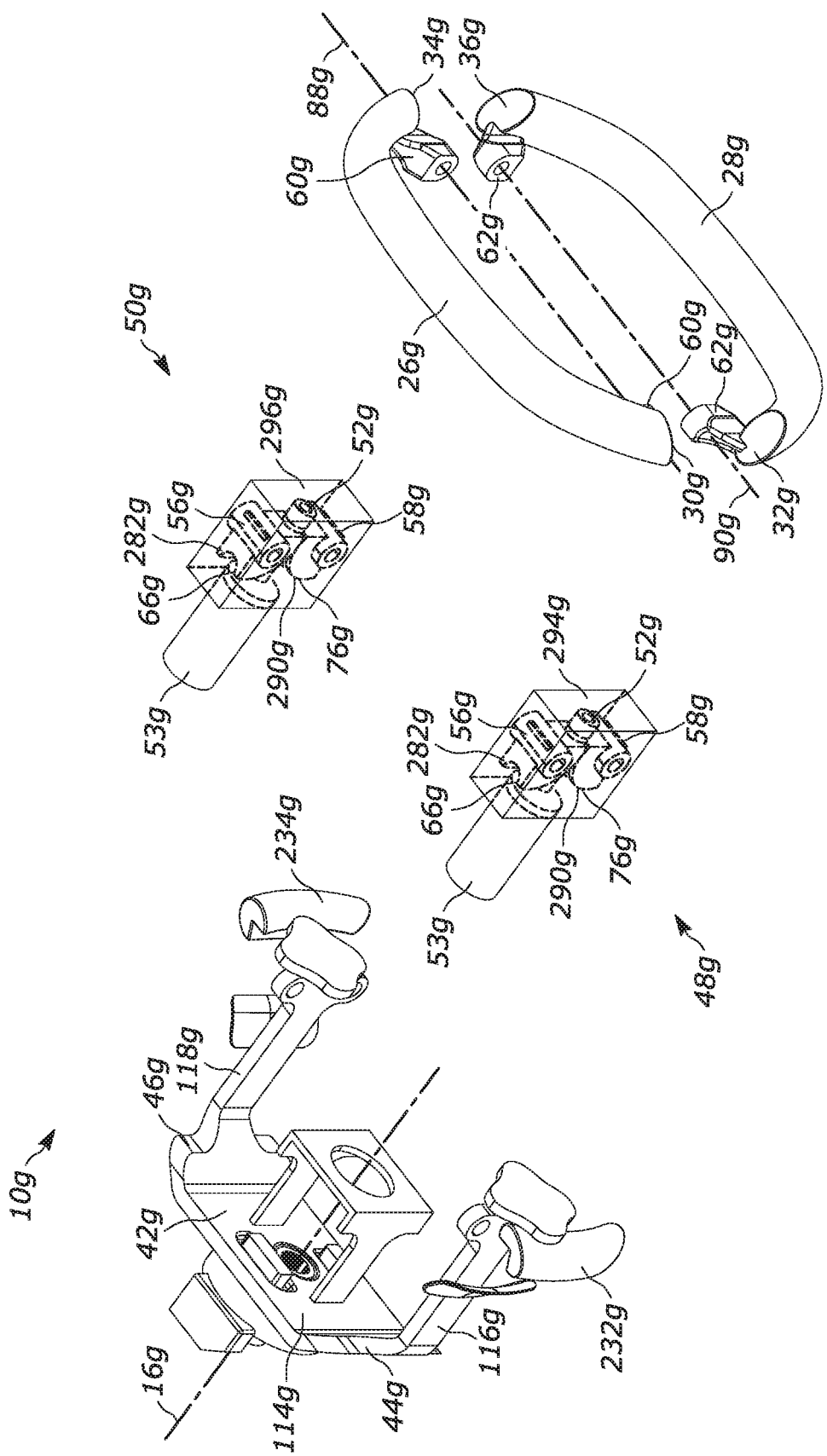
FIG. 31 is an exploded view of the steering wheel assembly of FIG. 27.

As shown in FIGS. 27, 29 and 31, the first and second switching portions 48*g*, 50*g* can also include first and second housings 294*g*, 296*g*. At least one of the gear drive 52*g*, the first transfer member 56*g*, the second transfer member 58*g*, and a portion of the motor 53*g* may be covered by the first and second housings 294*g*, 296*g*.

As shown in FIGS. 27-30, with the steering wheel 14*g* in the steering position, actuation of the gear drive 52*g* causes the first and second rim portions 26*g*, 28*g* to pivot relative to the support member 42*g* from the steering position to the folded position. The gear drive 52*g* rotates in a second clockwise direction CW2 relative to the support member 42*g* upon actuation. The gear drive 52*g* rotates the first transfer member 56*g* in the counterclockwise direction CCW relative to the support member 42*g*. The first mounting portion 60*g* pivots in the counterclockwise direction CCW relative to the support member 42*g*. As the first mounting portion 60*g* pivots relative to the support member 42*g*, the first rim portion 26*g* pivots about a first pivot axis 88*g* in the counterclockwise direction CCW relative to the support member 42*g* from the steering position to the folded position.

The gear drive 52*g* also rotates the second transfer member 58*g* in the clockwise direction CW relative to the support member 42*g*. The second mounting portion 62*g* pivots in the clockwise direction CW relative to the support member 42*g*. As the second mounting portion 62*g* pivots relative to the support member 42*g*, the second rim portion 28*g* pivots about a second pivot axis 90*g* in the clockwise direction CW relative to the support member 42*g* from the steering position to the folded position. The first and second pivot axes 88g, 90g extend generally parallel to each other and transverse to the steering axis 16g.

Although the gear drive 52g has been described as rotating in the clockwise direction to move the steering wheel 14g from the steering position to the folded position, the steering wheel assembly 10g can be designed so that the gear drive rotates in the counterclockwise direction to move the steering wheel from the steering position to the folded position.

The gear drive 52g can be actuated to reverse the above described process and cause the first and second rim portions 26g, 28g to pivot about the first and second pivot axes 88g, 90g, respectively, relative to the support member 42g from the folded position to the steering position.

Figure 32:
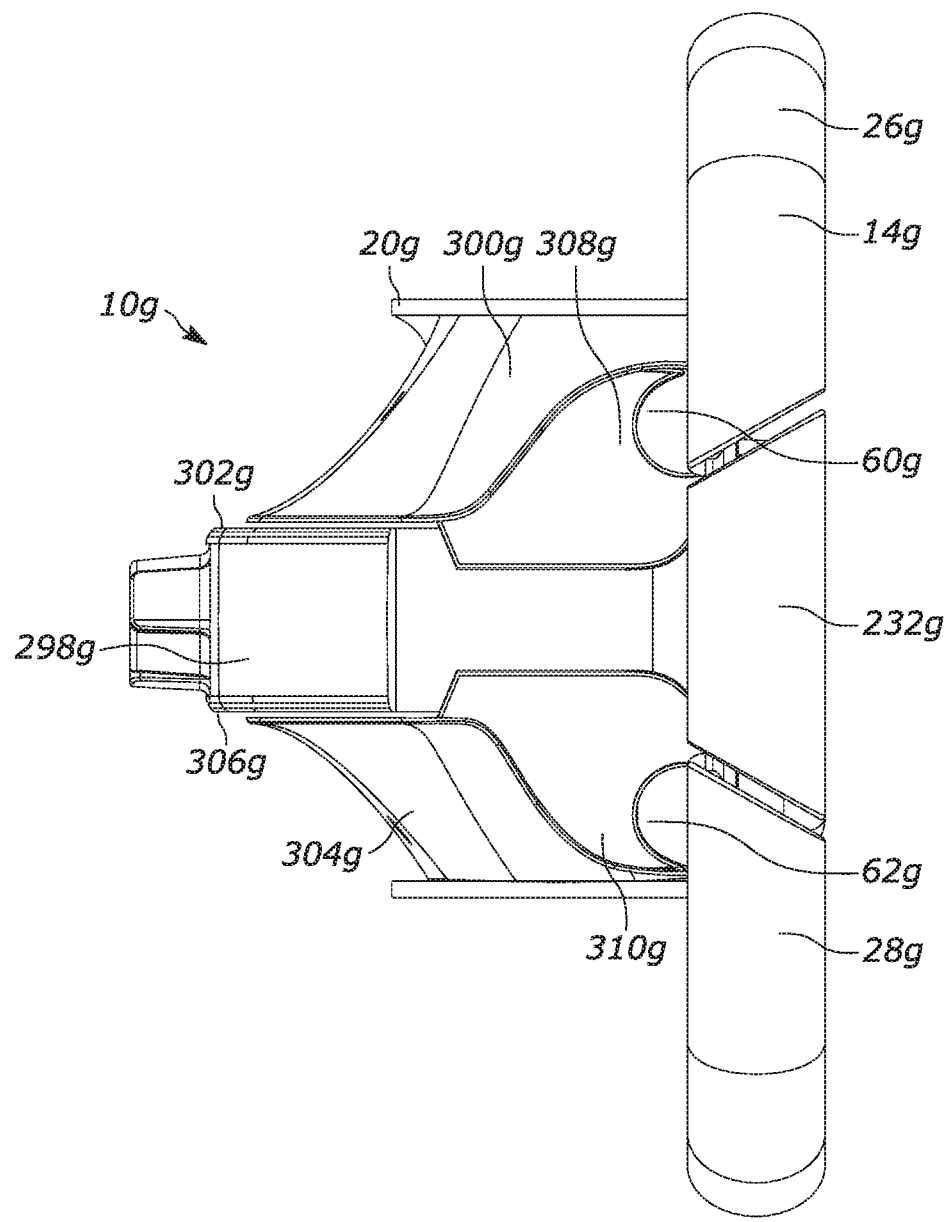
FIG. 32 is a side view of the steering wheel assembly of FIG. 27, including the steering wheel in the first position.
Figure 33:
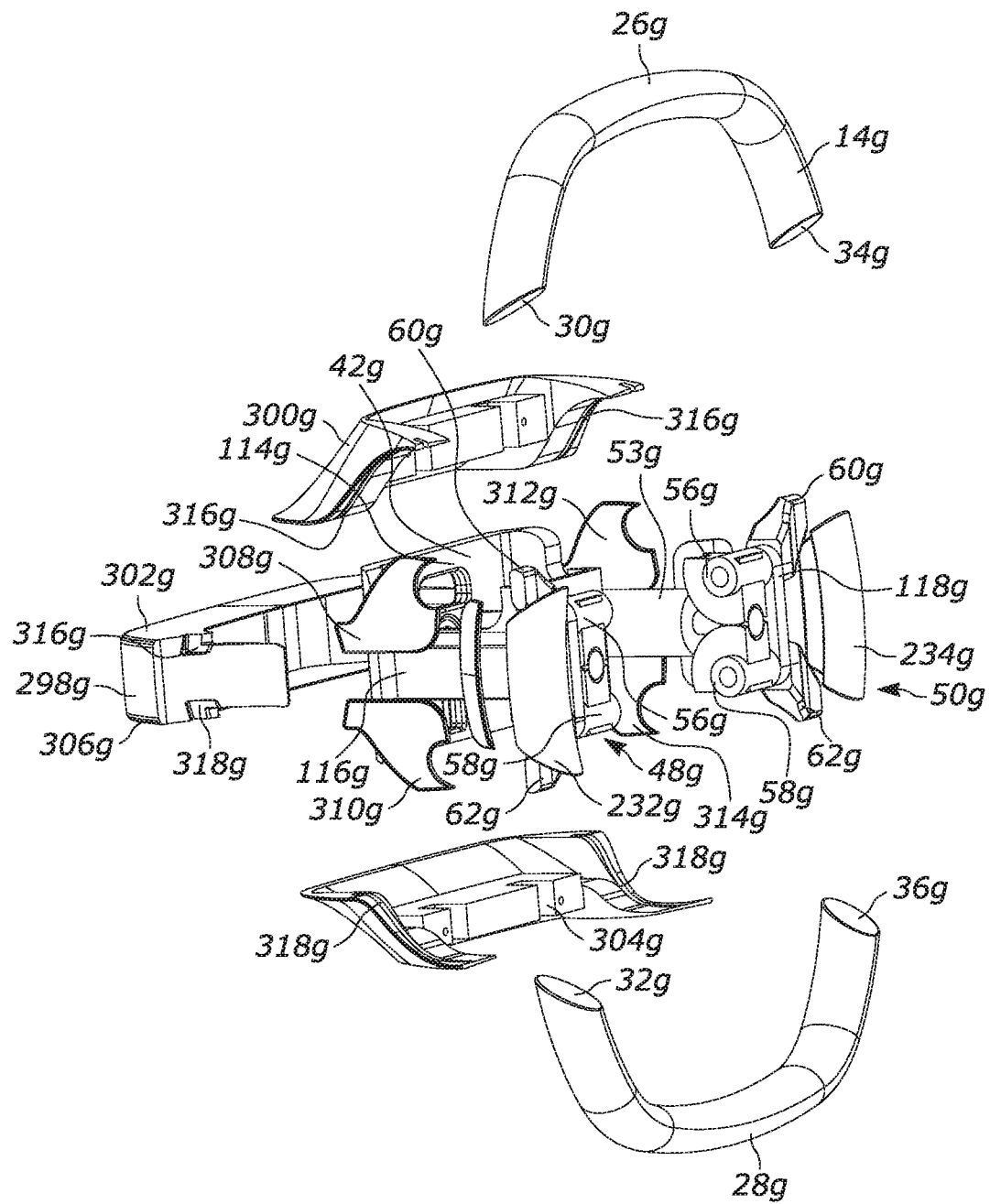
FIG. 33 is an exploded view of a portion of the steering wheel assembly of FIG. 32.

As shown in FIGS. 32-33, a first cover 298g can be fixedly attached to the base portion 114g and the first and second support arms 116g, 118g. A second cover 300g can be fixedly attached to the housing 20g and extend toward a first surface 302g of the first cover 298g. A third cover 304g can be fixedly attached to the housing 20g and extend toward a second surface 306g of the first cover 298g. The second surface 306g of the first cover 298g is opposite the first surface 302g. The first, second, and third covers 298g, 300g, 304g together with the housing 20g cover and enclose portions of the support member 42g, the first switching portion 48g and the second switching portion 50g.

First and second flexible inserts 308g, 310g may be provided to overlie and cover portions of the first switching portion 48g and/or the support member 42g. Third and fourth flexible inserts 312g, 314g may be provided to overlie and cover portions of the second switching portion 50g and/or the support member 42g. The third and fourth flexible inserts 312g, 314g mirror the first and second flexible inserts 308g, 310g and operate in a similar manner. Thus, for the sake of brevity, only the first and second flexible inserts 308g, 310g will be described below.

The first flexible insert 308g can be held within, such as by being press fit or by adhesive bonding, a first channel 316g that extends along the first cover 298g and the second cover 300g. The first flexible insert 308g can also be attached to the first mounting portion 60g. The second flexible insert 310g can be held within, such as by being press fit or by adhesive bonding, a second channel 318g that extends along the first cover 298g and the third cover 300g. The second flexible insert 310g can also be attached to the second mounting portion 62g. Alternatively, the first and second flexible inserts 308g, 310g can be attached to the steering wheel assembly 10g in any other desired manner.

The first and second flexible inserts 308g, 310g may have an elastic wire frame for press fitting the first and second flexible inserts in the first and second channels 316g, 318g. The first and second flexible inserts 308g, 310g can be at least partially formed from one or more deformable, flexible and/or stretchable materials, such as leather or elastic fabrics. Therefore, the first flexible insert 308g can flex, deform and/or stretch to conform to the movements of the first mounting portion 60g. Similarly, the second flexible insert 310g can flex, deform and/or stretch to conform to the movements of the second mounting portion 62g. The first and second flexible inserts 308g, 310g can thus flex as the steering wheel 14g is pivoted between the steering and folded positions to cover.

From the above description of the invention, those skilled in the art will perceive improvements, changes and modifications. Such improvements, changes and modifications within the skill of the art are intended to be covered by the appended claims.

Having described the invention, the following is claimed:

1. A steering wheel assembly for a vehicle, comprising:
   a support member connectable to a vehicle steering column;
   a steering wheel having first and second rim portions pivotable about at least one pivot axis between a steering position and a folded position;
   at least one gear drive operably connected to the first and second rim portions;
   at least one motor for rotating the at least one gear drive relative to the support member, rotation of the gear drive causing each of the first and second rim portions to pivot about the at least one pivot axis between the steering and folded positions.

2. The steering wheel assembly recited in claim 1, wherein
   an end of the first rim portion includes a first transfer member connected thereto, the first transfer member being operably connected to the gear drive, rotation of the gear drive causing the first transfer member to rotate, rotation of the first transfer member causing the first rim portion to pivot about the at least one pivot axis, and
   an end of the second rim portion includes a second transfer member connected thereto, the second transfer member being operably connected to the gear drive, rotation of the gear drive causing the second transfer member to rotate, rotation of the second transfer member causing the second rim portion to pivot about the at least one pivot axis.

3. The steering wheel assembly recited in claim 2, wherein
   the first transfer member is rotatably connected to the support member and has teeth that engage the gear drive so that the rotary motion of the gear drive rotates the first transfer member relative to the support member, rotary motion of the first transfer member causing the first rim portion to pivot relative to the support member, and
   the second transfer member is rotatably connected to the support member and has teeth that engage the teeth of the first transfer member so that the rotary motion of the first transfer member rotates the second transfer member relative to the support member, rotary motion of the second transfer member causing the second rim portion to pivot relative to the support member.

4. The steering wheel assembly recited in claim 2, wherein the first transfer member has external teeth engaging the gear drive, the second transfer member having internal teeth engaging the gear drive, the rotary motion of the gear drive causing the first and second transfer members to rotate in opposing directions.

5. The steering wheel assembly recited in claim 4, further comprising a guide member connected to the support member, the guide member having a first curved track in which the first transfer member slides, the guide member having a second curved track in which the second transfer member slides, the rotary motion of the gear drive causing the first and second transfer members to slide along the first and second curved tracks in opposing directions relative to the guide member, movement of the first transfer member along the first curved track causing the first transfer member to rotate relative to the guide member, movement of the second transfer member along the second curved track causing the second transfer member to rotate relative to the guide member.

6. The steering wheel assembly recited in claim 4, wherein the gear drive has a first gear engaging the external teeth of the first transfer member and a second gear engaging the internal teeth of the second transfer member, the first and second gears rotating relative to the support member when the gear drive is actuated, the rotary motion of the first and second gears of the gear drive causing the first and second transfer members to rotate in opposing directions relative to the support member.

7. The steering wheel assembly recited in claim 2, wherein the first transfer member is rotatably connected to the support member and engages the gear drive, the second transfer member being rotatably connected to the support member and engaging the gear drive, rotary motion of the gear drive causing the first and second transfer members to rotate in opposing directions relative to the support member, rotation of the first and second transfer members causing the first and second rim portions to pivot relative to the support member.

8. The steering wheel assembly recited in claim 2, wherein
the end of the first rim portion includes a first mounting portion connected to the first transfer member, the rotary motion of the first transfer member causing the first mounting portion and the first rim portion to pivot about the at least one pivot axis, and
the end of the second rim portion includes a second mounting portion connected to the second transfer member, the rotary motion of the second transfer member causing the second mounting portion and the second rim portion to pivot about the at least one pivot axis.

9. The steering wheel assembly recited in claim 8, wherein the support member has at least one actuatable locking member connected thereto, the at least one locking member engaging a corresponding locking member on one of the first mounting portion, the second mounting portion, the first transfer member and the second transfer member to lock the first and second rim portions in the steering or folded position.

10. The steering wheel assembly recited in claim 1, further comprising a carriage operably connected to the gear drive so that rotary motion of the gear drive linearly moves the carriage relative to the support member, the first and second rim portions being operably connected to the carriage, linear motion of the carriage causing the first and second rim portions to pivot about the at least one pivot axis between the steering and folded positions.

11. The steering wheel assembly recited in claim 10, wherein the carriage has teeth that engage the gear drive, the steering wheel assembly further comprising:
a first link having a first end connected to the carriage;
a second link having a first end connected to the carriage;
a first transfer member connected to an end of the first rim portion, a first end of the first transfer member being connected to a second end of the first link, a second end of the first transfer member being pivotably connected to the support member, the linear motion of the carriage causing the first link to pivot the first transfer member relative to the support member, the pivoting first transfer member causing the first rim portion to pivot relative to the support member; and
a second transfer member connected to an end of the second rim portion, a first end of the second transfer member being connected to a second end of the second link, a second end of the second transfer member being pivotably connected to the support member, the linear motion of the carriage causing the second link to pivot the second transfer member relative to the support member, the pivoting second transfer member causing the second rim portion to pivot relative to the support member.

12. The steering wheel assembly recited in claim 10, wherein
the carriage has a carriage base portion and first and second carriage pivot arms extending from the carriage base portion, one of the first and second carriage pivot arms having teeth that engage the gear drive, the steering wheel assembly further comprising:
a first transfer member connected to an end of the first rim portion;
a second transfer member connected to an end of the second rim portion;
a first pin pivotably connecting the first transfer member to the first carriage pivot arm, the linear motion of the carriage causing the first transfer member to rotate about the first pin relative to the carriage, rotary motion of the first transfer member pivoting the first rim portion relative to the carriage; and
a second pin pivotably connecting the second transfer member to the second pivot carriage arm, the linear motion of the carriage causing the second transfer member to rotate about the second pin relative to the carriage, rotary motion of the second transfer member pivoting the second rim portion relative to the carriage.

13. The steering wheel assembly recited in claim 12, wherein
the support member includes a base portion and a support arm extending from the base portion, first and second support arm openings extending through the support arm and at an acute angle relative to each other,
the carriage including first and second guide arms extending from the carriage base portion, the first guide arm having a first linear track that extends transverse to a steering axis, the second guide arm having a second linear track that extends transverse to the steering axis, the steering wheel assembly further comprising:
a first rotator member being slidable along the first linear track relative to the first guide arm, the first rotator member having a connecting portion extending through the first support arm opening and connected to the first transfer member, the linear motion of the carriage causing the first rotator member to move along the first support arm opening, walls defining the first support arm opening urging the first rotator member to linearly slide along the first linear track as the first rotator member moves along the first support arm opening, the linear motion of the first rotator member along the first linear track causing the first transfer member to rotate about the first pin; and
a second rotator member being slidable along the second linear track relative to the second guide arm, the second rotator member having a connecting portion extending through the second support arm opening and connected to the second transfer member, the linear motion of the carriage causing the second rotator member to move along the second support arm opening, walls defining the second support arm opening urging the second rotator member to linearly slide along the second linear track as the second rotator member moves along the second support arm opening, the linear motion of the second rotator member along the second linear track causing the second transfer member to rotate about the second pin.

14. The steering wheel assembly recited in claim 13, wherein
- the first carriage pivot arm includes a first slot extending therethrough, the first pin extending through the first carriage pivot arm opening, the first transfer member linearly moving the first pin along the first carriage pivot arm opening as the first transfer member rotates relative to the support member, and
- the second carriage pivot arm includes a second slot extending therethrough, the second pin extending through the second carriage pivot arm opening, the second transfer member linearly moving the second pin along the second carriage pivot arm opening as the second transfer member rotates relative to the support member.

15. The steering wheel assembly recited in claim 10, wherein the steering wheel assembly further comprises:
- a first transfer member connected to an end of the first rim portion, the first transfer member being connected to the carriage so that linear motion of the carriage linearly moves the first transfer member relative to the support member, the first transfer member having a first gearwheel connected thereto;
- a second transfer member connected to an end of the second rim portion, the second transfer member being connected to the carriage so that linear motion of the carriage linearly moves the second transfer member relative to the support member, the second transfer member having a second gearwheel connected thereto;
- a rack connected to the support member, the rack having first rack teeth engaging the first gearwheel and second rack teeth engaging the second gearwheel;
- a worm wheel rotatably connected to the rack and engaging the gear drive, rotary motion of the gear drive causing the worm wheel to rotate relative to the rack; and
- a leadscrew rotates with the worm wheel relative to the rack, the carriage threadingly engaging the leadscrew so that the rotary motion of the leadscrew linearly moves the carriage along the leadscrew relative to the leadscrew, the linear motion of the carriage linearly moving the first and second transfer members relative to the support member, linear motion of the first and second transfer members linearly moving the first and second gearwheels along the first and second rack teeth of the gear rack relative to the gear rack, the linear motion of the first and second gearwheels along the gear rack causing the first and second gearwheels to rotate relative to the support member, the rotary motion of the first and second gearwheels causing the first and second transfer members to rotate relative to the carriage, the rotary motion of the first and second transfer members causing the first and second rim portions to pivot relative to the carriage.

16. The steering wheel assembly recited in claim 10, wherein the support member includes at least one actuatable locking member connected thereto, the at least one locking member engaging a corresponding locking member on the carriage to lock the first and second rim portions in the steering or folded position.

17. The steering wheel assembly recited in claim 1, further comprising at least one flexible insert overlying and covering a portion of the steering wheel assembly, the at least one flexible insert flexing as the steering wheel is pivoted between the steering and folding positions.

18. The steering wheel assembly recited in claim 1, wherein the first and second rim portions extend transverse to a steering axis of the steering wheel when in the steering position, the first and second rim portions extending in the same general direction of the steering axis when in the folded position.

19. The steering wheel assembly recited in claim 1, further comprising an airbag module including
- a housing connected to the support member,
- an airbag inflatable from a stored condition in which the airbag is stored in the housing to a deployed condition in which the airbag is positioned between a vehicle occupant and the steering wheel, and
- an inflator positioned in the housing and configured to provide inflation fluid to the airbag.

20. The steering wheel assembly recited in claim 1, wherein the first and second rim portions are pivotable about a single pivot axis, the pivot axis extending generally transverse to a steering axis.

21. The steering wheel assembly recited in claim 1, wherein the first rim portion is pivotable about a first pivot axis and the second rim portion is pivotable a separate, second pivot axis, the first and second pivot axes extending generally parallel to each other and transverse to a steering axis of the steering wheel.

22. A steering wheel assembly for a vehicle, comprising:
- a support member connectable to a vehicle steering column;
- a steering wheel having first and second rim portions pivotable about at least one pivot axis between a steering position and a folded position, the first and second rim portions extending transverse to a steering axis of the steering wheel when in the steering position, the first and second rim portions extending in the same general direction of the steering axis when in the folded position; and
- at least one gear drive rotatable relative to the support member and operably connected to the first and second rim portions, rotation of the gear drive causing each of the first and second rim portions to pivot about the at least one pivot axis between the steering and folded positions.

* * * * *

UNITED STATES PATENT AND TRADEMARK OFFICE
CERTIFICATE OF CORRECTION

| | |
|---|---|
| PATENT NO. | : 11,148,700 B1 |
| APPLICATION NO. | : 16/851446 |
| DATED | : October 19, 2021 |
| INVENTOR(S) | : Helmstetter et al. |

It is certified that error appears in the above-identified patent and that said Letters Patent is hereby corrected as shown below:

On the Title Page

Item (71) Applicants:
Reads "ZF Automotive Germany GmbH, Alfdorf (DE)"
Should read --ZF Automotive Safety Germany GmbH, Aschaffenburg (DE)--

Signed and Sealed this
First Day of November, 2022

*Katherine Kelly Vidal*

Katherine Kelly Vidal
*Director of the United States Patent and Trademark Office*